(12) United States Patent
Petrov et al.

(10) Patent No.: US 9,215,027 B2
(45) Date of Patent: Dec. 15, 2015

(54) TRANSMISSION APPARATUS, RECEPTION APPARATUS, TRANSMISSION METHOD, RECEPTION METHOD, AND METHOD FOR GENERATING MULTI-DIMENSIONAL CONSTELLATIONS

(71) Applicant: Panasonic Corporation, Osaka (JP)

(72) Inventors: Mihail Petrov, Dresden (DE); Tomohiro Kimura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/301,762

(22) Filed: Jun. 11, 2014

(65) Prior Publication Data

US 2014/0307822 A1    Oct. 16, 2014

Related U.S. Application Data

(62) Division of application No. 13/389,915, filed as application No. PCT/JP2010/005078 on Aug. 17, 2010, now Pat. No. 8,792,324.

(30) Foreign Application Priority Data

Aug. 21, 2009  (EP) .................................... 09168370

(51) Int. Cl.
*H04J 11/00*   (2006.01)
*H04B 7/02*    (2006.01)

(52) U.S. Cl.
CPC .............. *H04J 11/0063* (2013.01); *H04B 7/02* (2013.01)

(58) Field of Classification Search
None
See application file for complete search history.

(56) References Cited

U.S. PATENT DOCUMENTS

| | | | |
|---|---|---|---|
| 5,832,044 | A  | 11/1998 | Sousa et al. |
| 6,449,246 | B1 | 9/2002  | Barton et al. |

(Continued)

FOREIGN PATENT DOCUMENTS

| | | |
|---|---|---|
| JP | 2004-304584    | 10/2004 |
| KR | 10-2005-0041346 | 5/2005 |
| KR | 10-2005-0065065 | 6/2005 |

OTHER PUBLICATIONS

International Search Report issued Apr. 4, 2011 in International (PCT) Application No. PCT/JP2010/005078.

(Continued)

*Primary Examiner* — Hassan Kizou
*Assistant Examiner* — Tejis Daya
(74) *Attorney, Agent, or Firm* — Wenderoth, Lind & Ponack, L.L.P.

(57) ABSTRACT

The present invention relates to digital data communication and provides an efficient method for generating multi-dimensional constellations for digital data modulation with a high degree of modulation diversity, a method for transmitting and receiving data on the basis of such constellations, and a corresponding apparatus. This is achieved by considering only multi-dimensional rotation matrices with all elements on the diagonal having the same first absolute value and all other elements having the same second absolute value. In this manner, multi-dimensional rotation matrices can be generated having only a single independent parameter and a structure that is as regular as possible. The independent parameter can be configured in order to minimize the error probability for various constellation sizes.

5 Claims, 14 Drawing Sheets

(56) References Cited

U.S. PATENT DOCUMENTS

| | | | |
|---|---|---|---|
| 6,633,614 B1 | 10/2003 | Barton et al. | |
| 7,095,812 B2 | 8/2006 | Chan et al. | |
| 7,430,244 B2 | 9/2008 | Chung et al. | |
| 2004/0001564 A1* | 1/2004 | Chan et al. | 375/341 |
| 2005/0163243 A1 | 7/2005 | Chung et al. | |
| 2009/0245401 A1* | 10/2009 | Chrabieh et al. | 375/260 |
| 2010/0303171 A1* | 12/2010 | Tong et al. | 375/300 |
| 2013/0076566 A1* | 3/2013 | Jiang et al. | 342/373 |

OTHER PUBLICATIONS

Mohamed Oussama Damen et al., "Diagonal Algebraic Space-Time Block Codes", IEEE Transactions on Information Theory, IEEE, US, vol. 48, No. 3, Mar. 1, 2002, pp. 628-629.

Joseph Boutros et al., "Signal Space Diversity: A Power- and Bandwidth-Efficient Diversity Technique for the Rayleigh Fading Channel", IEEE Transactions on Information Theory, IEEE, US, vol. 44, No. 4, Jul. 1, 1998, pp. 1453-1467.

Zhengdao Wang, Shengli Zhou and Georgios B. Giannakis, "Joint Coding-Precoding with Low-Complexity Turbo-Decoding", IEEE Transactions on Wireless Communications, IEEE Service Center, Piscataway, NJ, US, vol. 3, No. 3, May 1, 2004, pp. 832-842.

K. Boullé et al., "Modulation Schemes Designed for the Rayleigh Channel", Proceedings CISS 1992, Mar. 1, 1992, pp. 288-293.

Branko D. Jeličić et al., "Design of Trellis Coded QAM for Flat Fading and AWGN Channels", IEEE Transactions on Vehicular Technology, vol. 44, No. 1, Feb. 1994, pp. 192-193.

Extended European Search Report issued Feb. 18, 2010 in European Application No. 09168370.6.

Office Action issued Dec. 17, 2013 in corresponding Chinese Application No. 201080036099.0, with partial English translation.

Viterbo et al., New Algebraic Constructions of Rotated Zn-Lattice Constellations for the Rayleigh Fading Channel, IEEE, Apr. 2004.

Kim et al., New 4-Dimensional Constellation-Rotation Modulation Method for DVB-NGH, Jan. 9-12, 2011.

Chisab et al., A Proposed Improvement Model for Hybrid 3GPP-LTE-OFDMA-DS-CDMA Based on the Multiwavelet Transform, Mar. 2013.

Douillard et al., The Bit Interleaved Coded Modulation Module for DVB-NGH, Apr. 23-25, 2012.

Office Action issued Oct. 1, 2013 in U.S. Appl. No. 13/389,915.

* cited by examiner

Fig. 5
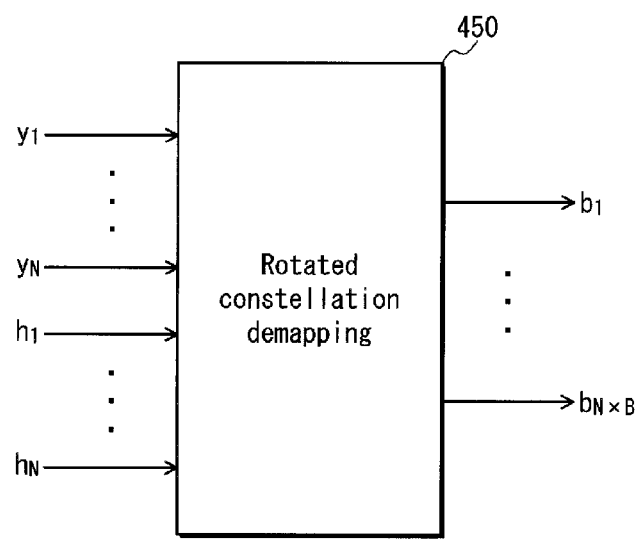
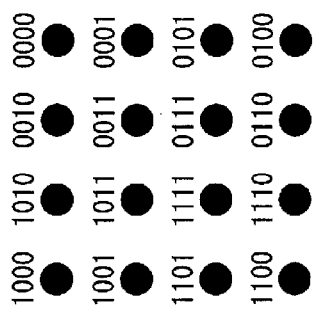
Fig. 6A

TRANSMISSION APPARATUS, RECEPTION APPARATUS, TRANSMISSION METHOD, RECEPTION METHOD, AND METHOD FOR GENERATING MULTI-DIMENSIONAL CONSTELLATIONS

TECHNICAL FIELD

The present invention relates to digital data communication, in particular to methods for generating multi-dimensional constellations for digital data modulation, methods for modulating and transmitting data on the basis of multi-dimensional constellations, and a corresponding apparatus.

BACKGROUND ART

Fading is one of the major problems in communication systems. It represents random fluctuations in the amplitude of the received signal due to multi-path propagation. If the delay spread of the channel is larger than the symbol period of the signal, the fading is also frequency selective. The amplitude of fading is usually approximated by a Rayleigh distribution. Such fading is referred to as Rayleigh fading.

In digital communication systems, information is encoded as a sequence of symbols belonging to a discrete alphabet, referred to as a constellation. Such a constellation has N dimensions and encodes B information bits per dimension. The number of possible values, also referred to as constellation points, is therefore $2^{N*B}$. The number of bits per dimension B directly determines the spectral efficiency of the transmission, given in bits/Hz. The number of dimensions N has no effect on the spectral efficiency. An example constellation with N=2 and B=1 is illustrated in FIG. 1A.

Traditionally, for example in a quadrature amplitude modulation (QAM) constellation shown in FIG. 1A, each transmitted bit affects only one dimension. Referring to FIG. 1A, "$b_1$" of each constellation point "$b_1 b_2$" (="00", "01", "10" and "11") affects only the dimension represented by the horizontal axis, whereas "$b_2$" of each constellation point "$b_1 b_2$" affects only the dimension represented by the vertical axis. If the dimension affected by the transmitted bits undergoes a deep fading, all bits that modulate this dimension will be extremely unreliable, which increases the error probability. This effect is illustrated by the errors in FIG. 1A. For example, if the channel represented by the vertical axis fades away, the constellation points "00", "01", "10" and "11" will approach the horizontal axis (along the solid arrows of FIG. 1A). As a result, the constellation points "00" and "01", as well as the constellation points "10" and "11", will be indiscernible.

If the constellation is modified such that each bit affects all dimensions, the resilience to fading is increased. A deep fading on one of the dimensions will affect all the bits of the constellation; however, this effect would not be as detrimental as in the conventional case, so that on average, the error probability decreases. This is referred to in the literature as modulation diversity.

(Rotated Constellations)

One way to achieve modulation diversity is to rotate a (hyper-cubic) constellation to spread the effect of a channel fading over all its dimensions. This is illustrated in FIG. 1B for the case where N=2 and B=1. For example, as shown in FIG. 1B, if the channel represented by the vertical axis fades away, the constellation points "00", "01", "10" and "11" will approach the horizontal axis (along the solid arrows of FIG. 1B). However, these constellation points will still be discernible in the dimension represented by the horizontal axis. As such, the constellation points "00", "01", "10" and "11" remain discernible even after a deep fading of the channel represented by the vertical axis.

A multi-dimensional rotation can be achieved by multiplying the N-element signal vector by an N*N square matrix. The necessary and sufficient condition for a square matrix to be a rotation matrix (or a reflection matrix) is for it to be orthogonal, i.e., to satisfy the equation of the following Math. 1.

$$RR^T = I \qquad \text{[Math. 1]}$$

Note that in the above Math. 1, the matrix
R
is a square matrix, the matrix
$R^T$
is a transpose matrix of the matrix
R,
and the matrix
I
is a unit matrix.

This means that with regard to the above Math. 1, the row/column vectors must be orthogonal unit vectors, i.e., satisfy the equation of the following Math. 2.

$$\sum_{i=1}^{n} r_{i,j} r_{i,k} = \delta_{j,k} \qquad \text{[Math. 2]}$$

Note that in Math. 2, $\delta_{j,k}=1$ if $j=k$, and $\delta_{j,k}=0$ if $j \neq k$.

This preserves the Euclidean distance between any two points of the constellation, and ensures that the performance in channels with additive white Gaussian noise (AWGN channels) is not affected.

Obviously, not all rotations yield the effect of improved modulation diversity. From NPL 1, it is known that the optimum rotation angle
θ
for 16-QAM satisfies the equation shown in the following Math. 3. The corresponding 2-D (two-dimensional) rotation matrix
R
satisfies the equation shown in the following Math. 4.

$$\theta = \pi/8 \qquad \text{[Math. 3]}$$

$$R = \begin{pmatrix} \cos\theta & -\sin\theta \\ \sin\theta & \cos\theta \end{pmatrix} \qquad \text{[Math. 4]}$$

Finding the optimum rotation for constellations of more than two dimensions is more complicated, because there is no single optimization parameter such as the one pertaining to the rotation angle in a 2-D constellation. In the case of a 4-D (four-dimensional) constellation, for example, there are six independent rotation angles, each with its own partial rotation matrix. The partial rotation angles are also called Givens angles in NPL 2. The final 4-D rotation matrix is obtained by multiplying the six Givens rotation matrices, namely the six matrices shown in the following Math. 5.

$$R_4^{1,2} = \begin{pmatrix} +\cos\theta_{1,2} & -\sin\theta_{1,2} & 0 & 0 \\ +\sin\theta_{1,2} & +\cos\theta_{1,2} & 0 & 0 \\ 0 & 0 & 1 & 0 \\ 0 & 0 & 0 & 1 \end{pmatrix},$$ [Math. 5]

$$R_4^{1,3} = \begin{pmatrix} +\cos\theta_{1,3} & 0 & -\sin\theta_{1,3} & 0 \\ 0 & 1 & 0 & 0 \\ +\sin\theta_{1,3} & 0 & +\cos\theta_{1,3} & 0 \\ 0 & 0 & 0 & 1 \end{pmatrix},$$

$$R_4^{1,4} = \begin{pmatrix} +\cos\theta_{1,4} & 0 & 0 & -\sin\theta_{1,4} \\ 0 & 1 & 0 & 0 \\ 0 & 0 & 1 & 0 \\ +\sin\theta_{1,4} & 0 & 0 & +\cos\theta_{1,4} \end{pmatrix},$$

$$R_4^{2,3} = \begin{pmatrix} 1 & 0 & 0 & 0 \\ 0 & +\cos\theta_{2,3} & -\sin\theta_{2,3} & 0 \\ 0 & +\sin\theta_{2,3} & +\cos\theta_{2,3} & 0 \\ 0 & 0 & 0 & 1 \end{pmatrix},$$

$$R_4^{2,4} = \begin{pmatrix} 1 & 0 & 0 & 0 \\ 0 & +\cos\theta_{2,4} & 0 & -\sin\theta_{2,4} \\ 0 & 0 & 1 & 0 \\ 0 & +\sin\theta_{2,4} & 0 & +\cos\theta_{2,4} \end{pmatrix},$$

$$R_4^{3,4} = \begin{pmatrix} 1 & 0 & 0 & 0 \\ 0 & 1 & 0 & 0 \\ 0 & 0 & +\cos\theta_{3,4} & -\sin\theta_{3,4} \\ 0 & 0 & +\sin\theta_{3,4} & +\cos\theta_{3,4} \end{pmatrix}$$

From NPL 2, it is known that the optimization may be carried out over the vector having the six elements shown in the following Math. 6.

$$\theta = (\theta_{1,2}, \theta_{1,3}, \theta_{1,4}, \theta_{2,3}, \theta_{2,4}, \theta_{3,4})$$ [Math. 6]

According to NPL 2, the resulting optimum rotation angles for a 4-D constellation with two bits per dimension have the values shown in the following Math. 7.

$$\begin{cases} \theta_{1,2} = 39° \\ \theta_{1,3} = 25° \\ \theta_{1,4} = 43° \\ \theta_{2,3} = 53° \\ \theta_{2,4} = 41° \\ \theta_{3,4} = 23° \end{cases}$$ [Math. 7]

The disadvantage of this method is the number of parameters, specifically for a large number of dimensions. For N dimensions, the number of partial rotation angles is equal to the number of possible combinations of two from a set of N, i.e., the value given by the following Math. 8.

$$\binom{N}{2} = \frac{N!}{2!(N-2)!} = \frac{N(N-1)}{2}$$ [Math. 8]

Hence, the number of rotation angles increases with the square of the number of dimensions, so the optimization problem becomes very difficult when the number of dimensions is large.

NPL 3 discloses two different approaches, relying on the use of the algebraic number theory, which have the advantage of a reduced number of parameters.

The first approach allows the construction of rotation matrices by applying the "canonical embedding" to an algebraic number field. Two methods are proposed. The first method produces lattices with diversity L=N/2 for the number of dimensions $N=2^{e2}3^{e3}$, with e2, e3=0, 1, 2, . . . . Diversity means the minimum number of different values in the components of any two distinct points of the constellation. The second method produces lattices with diversity L=N. The possible values of N are very limited, such as 3, 5, 9, 11, and 15.

A variant of this method for generating N-dimensional rotated constellations is also known from NPL 3. The rotation matrix

R is expressed by the following Math. 9.

$$R = \sqrt{\frac{2}{N}} \cos\left(\frac{2\pi}{8n}[4 \times [1, 2, \ldots, N] - 1]^T [2 \times [1, 2, \ldots, N] - 1]\right)$$ [Math. 9]

Note that the superscripted letter "$^T$" denotes the transpose of a matrix.

For N=4, the value of the rotation matrix

R is given by the following Math. 10.

$$R = \begin{pmatrix} +0.5879 & -0.1379 & -0.6935 & -0.3928 \\ +0.1379 & -0.3928 & +0.5879 & -0.6935 \\ -0.3928 & +0.6935 & -0.1379 & -0.5879 \\ -0.6935 & -0.5879 & -0.3928 & -0.1379 \end{pmatrix}$$ [Math. 10]

Although the resulting rotation matrix is a rotation matrix that is orthogonal for any N, the full modulation diversity is only achieved when N is a power of two.

Each of these methods can guarantee a certain degree of diversity. However, the resulting rotation matrix is fixed, having no parameter that allows the optimization for different constellation sizes. Therefore, a severe disadvantage of these methods is that the effect of modulation diversity cannot be maximized in accordance with different constellation sizes.

The second approach first constructs rotation matrices with two and three dimensions, which can be used as base matrices for constructing matrices with more dimensions using a Hadamard-like stacked expansion shown in the following Math. 11.

$$R = \begin{pmatrix} +R_1 & -R_2 \\ +R_2 & +R_1 \end{pmatrix} \quad \text{[Math. 11]}$$

The base 2-D and 3-D (three-dimensional) rotation matrices have a single independent parameter which is chosen so that the product distance of the constellation is maximized. A 4-D rotation matrix is constructed from two 2-D rotation matrices according to the above Math. 11. Because of the relative small dimension, it is possible to find an algebraic relationship between parameters of the two 2-D rotation matrices, so that the product distance is maximized. For larger dimensions, such an optimization becomes intractable, which is the primary disadvantage of the second approach.

(Mapping constellation components to ensure independent fading)

Another aspect concerns the separation and mapping of the N dimensions of the rotated constellation so that they experience independent fading. This is a key aspect necessary for achieving the expected diversity performance.

The N constellation components, which are obtained by separating the N-dimensional rotated constellation on a per-dimension basis, can be transmitted over different time slots, frequencies, transmitter antennas, or combinations thereof. Further signal processing is possible before transmission. The critical aspect is that fading experienced by each of the N dimensions must be different from, or ideally uncorrelated with, fading experienced by any other one of the N dimensions.

The spreading of the N dimensions across different time slots, frequencies and antennas can be achieved for example through appropriate interleaving and mapping.

(Mapping Constellation Components to Transmitted Complex Cells)

Another aspect concerns the mapping of the N real dimensions of the rotated constellation to complex symbols for transmission. In order to ensure the desired diversity, the N dimensions must be mapped to different complex symbols. The complex symbols are then spread as described earlier, e.g. through interleaving and mapping, so that at the reception, fading experienced by each of the N dimensions is uncorrelated with fading of any other one of the N dimensions.

FIG. 2 is a block diagram of a transmission apparatus.

The transmission apparatus is composed of an FEC encoder 210, a bit interleaver 220, a rotated constellation mapper 230, a complex symbol mapper 240, a symbol interleaver/mapper 250, modulation chains 260-1 to 260-M, and transmitter antennas 270-1 to 270-M.

The FEC encoder 210 performs forward error correction (FEC) encoding on the input thereto. Note that the best FEC codes known so far, which are also the most used in new standards, are the turbo codes and the low-density parity check (LDPC) codes.

The bit interleaver 220 performs bit interleaving on the input from the FEC encoder 210. Here, the bit interleaving can be block interleaving or convolution interleaving.

The rotated constellation mapper 230 maps the input from the bit interleaver 220 to the rotated constellation.

Generally, the input to the rotated constellation mapper 230 is the output of the FEC encoder 210 via the bit interleaver 220 that performs optional bit interleaving. The bit interleaving is usually required when there are more than one bit per dimension (B>1). The FEC encoding performed by the FEC encoder 210 introduces redundant bits in a controlled fashion, so that propagation errors can be corrected in the reception apparatus. Although the overall spectral efficiency decreases, the transmission becomes overall more robust, i.e., the bit error rate (BER) decays much faster with the signal to noise ratio (SNR).

Note that regarding the original mapping of the information bits on the non-rotated hyper-cubic constellations, each dimension is modulated separately by B bits, using either binary or Gray mapping, so the number of discrete values is $2^B$ and the number of constellation points is $2^{B*N}$.

The complex symbol mapper 240 maps each of N constellation components, which represent N-dimensional rotated constellation symbols input from the rotated constellation mapper 230, to a different one of complex symbols.

There are multiple possibilities for the mapping performed by the complex symbol mapper 240, i.e., the mapping of each of N constellation components, which represent N-dimensional rotated constellation symbols, to a different one of complex symbols. Some of such possibilities are illustrated in FIG. 3. The essential function of the complex symbol mapper 240 is to map each of N constellation components of one rotated constellation symbol to a different one of complex symbols.

By way of example, FIG. 3 shows the case of four dimensions. Referring to FIG. 3, the boxes showing the same number (e.g., "1") represent a group of 4-D rotated constellation symbols. The number shown by each box indicates the group number of the corresponding group. Also, each box indicates a constellation component of one dimension.

Shown below "Constellation symbols" in FIG. 3 is a state where six groups of 4-D rotated constellation symbols are aligned. Shown below "Complex symbols" in FIG. 3 are twelve complex symbols, which are obtained by rearranging the six groups of 4-D rotated constellation symbols shown below "Constellation symbols" in FIG. 3. Note that FIG. 3 shows three forms of "Complex symbols" as examples. At the time of actual transmission, a pair of two constellation components that are vertically aligned below "Complex symbols" (the result of rearrangement) is modulated and transmitted as one complex symbol.

The symbol interleaver/mapper 250 performs symbol interleaving on the complex symbols input from the complex symbol mapper 240, and thereafter maps the complex symbols to different time slots, frequencies, transmitter antennas, or combinations thereof. Here, the symbol interleaving can be block interleaving or convolution interleaving.

The modulation chains 260-1 to 260-M are provided in one-to-one correspondence with the transmitter antennas 270-1 to 270-M. Each of the modulation chains 260-1 to 260-M inserts pilots for estimating the fading coefficients into the corresponding input from the symbol interleaver/mapper 250, and also performs various processing, such as conversion into the time domain, digital-to-analog (D/A) conversion, transmission filtering and orthogonal modulation, on the corresponding input. Then, each of the modulation chains 260-1 to 260-M transmits the transmission signal via a corresponding one of the transmitter antennas 270-1 to 270-M.

(Receiver Side)

On the receiver side, the exact inverse steps of the steps performed by the transmission apparatus must be performed. FIG. 4 shows a block diagram of a reception apparatus corresponding to the transmission apparatus whose block diagram is shown in FIG. 2.

The reception apparatus is composed of receiver antennas 410-1 to 410-M, demodulation chains 420-1 to 420-M, a symbol demapper/deinterleaver 430, a complex symbol demapper 440, a rotated constellation demapper 450, a bit deinterleaver 460, and an FEC decoder 470.

The demodulation chains 420-1 to 420-M are provided in one-to-one correspondence with the receiver antennas 410-1 to 410-M. Each of the demodulation chains 420-1 to 420-M performs processing such as A/D conversion, reception filtering, and orthogonal demodulation on the signal transmitted by the transmission apparatus of FIG. 2 and received by a corresponding one of the receiver antennas 410-1 to 410-M. Then, the demodulation chains 420-1 to 420-M estimate (i) the amplitude values (fading coefficients) of the channel characteristics by using the pilots and (ii) noise variance, and output the estimated amplitude values and noise variance together with the phase-corrected received signal.

The symbol demapper/deinterleaver 430 performs the inverse processing of the processing performed by the symbol interleaver/mapper 230 in the transmission apparatus on the inputs from the demodulation chains 420-1 to 420-M.

The complex symbol demapper 440 performs the inverse processing of the processing performed by the complex symbol mapper 240 in the transmission apparatus on the input from the symbol demapper/deinterleaver 430. Through this processing, N-dimensional rotated constellation symbols can be obtained.

The rotated constellation demapper 450 performs demapping processing on the N-dimensional rotated constellation symbols, and outputs a decision result of each bit included in the N-dimensional rotated constellation.

The bit deinterleaver 460 performs the inverse processing of the processing performed by the bit interleaver 220 in the transmission apparatus on the input from the rotated constellation demapper 450.

The FEC decoder 470 performs FEC decoding on the input from the bit deinterleaver 470.

Below, further explanations of the rotated constellation demapper 450 are given.

The rotated constellation demapper 450 can perform the processing of demapping N-dimensional rotated constellation symbols in the following two ways (i) and (ii).

(i) First de-rotate the constellation, then extract the bits for each dimension separately.

(ii) Decode the bits of all dimensions in one step.

Although the first solution (the above (i)) is the most simple, its performance is suboptimal and even worse for rotated constellations than for non-rotated constellations. Due to its simplicity, this solution may be used in some low-cost reception apparatuses.

Although the second solution (the above (ii)) is more complex, it offers much better performance in terms of BER at a given SNR. In the following, the second solution will be described in greater detail.

As with the transmission apparatus, a preferred embodiment of the reception apparatus includes the FEC decoder 470 after the rotated constellation demapper 450, with the optional bit deinterleaver 460 in between, as shown in FIG. 4. More exactly, the rotated constellation demapper 450, which performs the rotated constellation demapping, receives N-dimensional symbol vectors $(y_1, \ldots, y_N)$ and the estimated fading coefficient vectors $(h_1, \ldots, h_N)$, and extracts data of N*B bits $(b_1, \ldots, b_{N*B})$ from each symbol, as shown in FIG. 5.

When FEC decoding is used, the processing of demapping the N-dimensional rotated constellation symbols can no longer be performed by way of a hard decision, because the performance of the error correction would be suboptimal. Instead, "soft bits" must be used, either in the form of probabilities or in the form of log-likelihood ratios (LLRs). The LLR representation is preferred because probability multiplications can be conveniently expressed as sums. By definition, the LLR of a bit $b_k$ is shown in the following Math. 12.

$$L(b_k \mid y) \triangleq \ln \frac{P(b_k = 1 \mid y)}{P(b_k = 0 \mid y)} \quad [\text{Math. 12}]$$

Note that in Math. 12, $P(b_k=0|y)$ and $P(b_k=1|y)$ are the a-priori probabilities that $b_k=0$ and $b_k=1$ were transmitted when the symbol vector y is received. According to the known theory, the LLR of a bit $b_k$ of a constellation has the exact expression shown in the following Math. 13.

$$L(b_k) = \ln \frac{\sum_{s \in S_k^1} \exp\left(-\frac{\|y - Hs\|^2}{2\sigma^2}\right)}{\sum_{s \in S_k^0} \exp\left(-\frac{\|y - Hs\|^2}{2\sigma^2}\right)} \quad [\text{Math. 13}]$$

Note that in Math. 13, k is the bit index, y is the received symbol vector,

H is the diagonal matrix having the associated (estimated) fading coefficients as elements on the main diagonal,

S is a constellation point vector, $\| \ \|^2$ is the squared norm, and $\sigma^2$ is the noise variance.

For an N-dimensional constellation, the squared norm represents the squared Euclidean distance from the received symbol vector y to the faded constellation symbol vector Hs in the N-dimensional space. The squared norm can be expressed by the following Math. 14.

$$\|y - Hs\|^2 = \sum_{n=1}^{N} |y_n - h_n s_n|^2 \quad [\text{Math. 14}]$$

Each bit $b_k$ divides the constellation into two partitions of equal size, $S_k^0$ and $S_k^1$, corresponding to those points for which $b_k$ is 0 and 1, respectively. Examples are shown in FIGS. 6A and 6B for a classical 16-QAM constellation with Gray encoding. FIG. 6A shows the constellation encoding and FIG. 6B shows the two partitions for each bit $b_k$.

The exact expression for the LLR (the above Math. 13) is difficult to calculate due to the exponentials, divisions and the logarithm. In practice, the approximation shown in the following Math. 15 is made, called max-log, which introduces negligible errors.

$$\ln(e^{a_1}+e^{a_2}) \approx \max(a_1,a_2) \rightarrow \ln(e^{-a_1}+e^{-a_2}) \approx \min(a_1,a_2) \quad \text{[Math. 15]}$$

By using the above Math. 15, the above Math. 13 leads to a much more simple expression for the LLR, which is shown in the following Math. 16.

$$L(b_k) \approx \frac{1}{2\sigma^2} \min_{s \in S_k^0} \|y - Hs\|^2 - \frac{1}{2\sigma^2} \min_{s \in S_k^1} \|y - Hs\|^2 \quad \text{[Math. 16]}$$

For each received symbol vector
y,
the distances to all $2^{B*N}$ constellation points must be calculated, and the corresponding minimum for each partition is determined.

FIG. 7 shows a preferred hardware implementation of an LLR demapper (one example of the rotated constellation demapper 450 shown in FIG. 4) for a 16-QAM rotated constellation (N=2, B=2).

The LLR demapper is composed of a counter 710, a rotated constellation mapper 720, a squared Euclidean distance calculator 730, minimizers 740-1 to 740-4, and adders 750-1 to 750-4.

For each received symbol vector
y,
the counter 710 repeatedly generates all $2^4$=16 constellation points, and outputs four bits $b_1$, $b_2$, $b_3$ and $b_4$ indicating the constellation points to the rotated constellation mapper 720.

The rotated constellation mapper 720 selects the 2-D rotated constellation point from a look-up table by using the counter values provided by the counter 710 as an indexes, and outputs two constellation components $s_1$ and $s_2$ obtained through this selection to the squared Euclidean distance calculator 730.

The squared Euclidean distance calculator 730 calculates the squared Euclidean distances (see FIG. 8).

For each bit, the minimizers 740-1 to 410-4 maintain the corresponding minimum squared Euclidean distances for the two partitions (see FIG. 9). The two constellation partitions for each bit are simply indicated by the corresponding bit of the counter 710.

Each of the adders 750-1 to 750-4 subtracts the output of min1 (corresponding to bit 1) from the output of min0 (corresponding to bit 0), the min1 and min0 being provided in each of the minimizers 740-1 to 740-4. Thereafter, the adders 750-1 to 750-4 output the results of the subtraction as $L(b_1)$ to $L(b_4)$, respectively.

FIG. 8 is a circuit diagram of a squared Euclidean distance calculator that calculates an N-dimensional squared Euclidean distance. Note that the circuit structure of the squared Euclidean distance calculator 730 has been modified from the one shown in FIG. 8 so as to satisfy N=2.

The squared Euclidean distance calculator is composed of multipliers 810-1 to 810-N, adders 820-1 to 820-N, multipliers 830-1 to 830-N, an adder 840, and a multiplier 850.

The multipliers 810-1 to 810-N multiply $h_1$ to $h_N$ by $s_1$ to $s_N$, respectively. The adders 820-1 to 820-N subtract $h_1s_1$ to $h_Ns_N$ from $y_1$ to $y_N$, respectively. The multipliers 830-1 to 830-N multiply $(y_1-h_1s_1)$ to $(y_N-h_Ns_N)$ by $(y_1-h_1s_1)$ to $(y_N-h_Ns_N)$, respectively.

The adder 840 adds together the outputs of the multipliers 830-1 to 830-N. The multiplier 850 multiplies the output of the adder 840 by $$1/(2\sigma^2).$$

The output of the multiplier 850 is the N-dimensional squared Euclidean distance.

FIG. 9 is a circuit diagram of the minimizers 740-1 to 740-4 that each calculate the minimum squared Euclidean distances for each bit. The 1-bit subset (or partition) input indicates the current position.

Each of the minimizers 740-1 to 740-4 is composed of a comparator 910, a selector 920, an inverter 930, D flip-flops 940-0 and 940-1, and a selector 950.

The following describes the operations to be performed in the situation of FIG. 9 when the subset value (the value input from the counter 710) is "0".

From among the output of the D flip-flop 940-0 and the output of the D flip-flop 940-1, the selector 950 selects and outputs the former.

The comparator 910 compares din (A), which indicates the squared Euclidean distance calculated by the squared Euclidian distance calculator 730, with the output (B) of the selector 950. In a case where B is smaller than A, the comparator 910 outputs "0". In this case, from among din and the output of the selector 950, the selector 920 selects and outputs the latter based on "0" received from the comparator 910. On the other hand, in a case where A is smaller than B, the comparator 910 outputs "1". In this case, from among din and the output of the selector 950, the selector 920 selects and outputs the former based on "1" received from the comparator 910. Note that in a case where A is equal to B, the same result will be obtained whether the selector 920 selects din or the output of the selector 950. Accordingly, in this case, the comparator 910 may output either one of "0" and "1".

The inverter 930 inverts the subset value "0". Thus, "1" is input to the enable terminal of the D flip-flop 940-0. As the D flip-flop 940-0 is enabled, it latches the output of the selector 920. Meanwhile, "0" is input to the enable terminal of the D flip-flop 940-1. As the D flip-flop 940-1 is disabled, it does not latch the output of the selector 920.

The following describes the operations to be performed in the situation of FIG. 9 when the subset value is "1".

From among the output of the D flip-flop 940-0 and the output of the D flip-flop 940-1, the selector 950 selects and outputs the latter.

The comparator 910 compares din (A) with the output (B) from the selector 950. In a case where B is smaller than A, the comparator 910 outputs "0". In this case, from among din and the output of the selector 950, the selector 920 selects and outputs the latter based on "0" received from the comparator 910. On the other hand, in a case where A is smaller than B, the comparator 910 outputs "1". In this case, from among din and the output of the selector 950, the selector 920 selects and outputs the former based on "1" received from the comparator 910. Note that in a case where A is equal to B, the same result will be obtained whether the selector 920 selects din or the output of the selector 950. Accordingly, in this case, the comparator 910 may output either one of "0" and "1".

"1" is input to the enable terminal of the D flip-flop 940-1. As the D flip-flop 940-1 is enabled, it latches the output of the selector 920. Meanwhile, the inverter 930 inverts the subset value "1". Thus, "0" is input to the enable terminal of the D flip-flop 940-0. As the D flip-flop 940-0 is disabled, it does not latch the output of the selector 920.

A significant improvement in performance of the reception apparatus can be achieved by using iterative decoding. As shown in FIG. 10, the reception apparatus configured to utilize such iterative decoding is composed of a rotated constellation demapper 1010, a bit deinterleaver 1020, an FEC decoder 1030, an adder 1040, and a bit interleaver 1050. Here, the rotated constellation demapper 1010 and the FEC decoder 1030 are connected in a loop.

The rotated constellation demapper 1010 performs demapping processing on N-dimensional rotated constellation symbols, and outputs L (see FIG. 11). The bit deinterleaver 1020 performs the inverse processing of the processing performed by the bit interleaver 220 in the transmission apparatus on the input from the rotated constellation demapper 1010. The FEC decoder 1030 performs FEC decoding on the input from the bit deinterleaver 1020.

The adder 1040 subtracts the input from the FEC decoder 1030 from the output of the FEC decoder 1030. The bit interleaver 1050 performs the same processing as the processing performed by the bit interleaver 220 in the transmission apparatus on the output of the adder 1040, and then outputs $L_E$. $L_E$, also referred to as extrinsic information, is fed back to the rotated constellation demapper 1010 in order to aid the demapping processing performed by the rotated constellation demapper 1010, i.e., the processing of demapping the N-dimensional rotated constellation symbols. In this case it is essential that the FEC decoding produces soft bits, e.g. in the form of LLRs.

As known in the literature, the formula for calculating the LLR for bit $b_k$ is given by the following Math. 17.

$$L(b_k) \approx \min_{x \in X_k^0} \left\{ \frac{1}{2\sigma^2} \|y - Hs(x)\|^2 + \sum_{\substack{i=1 \\ x_i=1, i \neq j}}^{K} L_E(b_i) \right\} - \min_{x \in X_k^1} \left\{ \frac{1}{2\sigma^2} \|y - Hs(x)\|^2 + \sum_{\substack{i=1 \\ x_i=1, i \neq j}}^{K} L_E(b_i) \right\}$$ [Math. 17]

In Math. 17,
X
represents the K=N*B bits associated with each constellation point, and $X_k^0$ and $X_k^1$ represent the two constellation partitions associated with bit k, each constellation point being represented by the N*B bits instead of the N bits of integer coordinates. Furthermore,
S
is expressed as $$S(X)$$

and represents the constellation mapping function.

For example, $X_3^0$ and $X_3^1$ are shown in the following Math. 18.

| $X_3^0$ | $X_3^1$ | [Math. 18] |
|---|---|---|
| 0000 | 0100 | |
| 0001 | 0101 | |
| 0010 | 0110 | |
| 0011 | 0111 | |
| 1000 | 1100 | |
| 1001 | 1101 | |
| 1010 | 1110 | |
| 1011 | 1111 | |

FIG. 11 shows an example of the structure of the rotated constellation demapper 1010 for iterative decoding. Note that the rotated constellation demapper 1010 for iterative decoding is similar to a rotated constellation demapper for non-iterative decoding. Below, the elements that are the same as those described above are assigned the same reference numerals thereas, and a detailed description thereof is omitted.

The rotated constellation demapper 1010 is composed of a counter 710, a rotated constellation mapper 720, a squared Euclidean distance calculator 730, minimizers 740-1 to 740-4, adders 750-1 to 750-4, logical AND operators 1110-1 to 1110-4, an adder 1120, adders 1130-1 to 1130-4, and adders 1140-1 to 1140-4.

The logical AND operators 1110-1 to 1110-4 perform logical AND operations on the outputs of the bit interleaver 1050, namely $L_E(b1)$ to $L_E(b4)$, and the outputs of the counter 710, namely b1 to b4. The adder 1120 adds together the outputs of the logical AND operators 1110-1 to 1110-4. Each of the adders 1130-1 to 1130-4 subtracts, from the output of the adder 1120, the output of a corresponding one of the logical AND operators 1110-1 to 1110-4. Each of the adders 1140-1 to 1140-4 subtracts, from the output of the squared Euclidean distance calculator 730, the output of a corresponding one of the adders 1130-1 to 1130-4. Then, each of the adders 1140-1 to 1140-4 outputs the value obtained through the subtraction to din of a corresponding one of the minimizers 740-1 to 740-4.

CITATION LIST

Non Patent Literature

[NPL 1]
K. Boulle and J. C. Belfiore. "Modulation Scheme Designed for the Rayleigh Fading Channel." Presented at CISS 1992.
[NPL 2]
B. D. Jelicic and S. Roy. "Design of Trellis Coded QAM for Flat Fading and AWGN Channels." IEEE Transactions on Vehicular Technology, Vol. 44. February 1995.
[NPL 3]
J. Boutros and E. Viterbo. "Signal Space Diversity: A Power- and Bandwidth-Efficient Diversity Technique for the Rayleigh Fading Channel." IEEE Transactions on Information Theory, Vol. 44. July 1998.
[NPL 4]
M. O. Damen, K. Abed-Meraim, and J. C. Belfiore. "Diagonal Algebraic Space-Time Block Codes." IEEE Transactions on Information Theory, Vol. 48. March 2002.

SUMMARY OF INVENTION

Technical Problem

As described above, although a wide range of proposals have been made regarding rotation matrices for rotating a constellation, the proposals that have been made so far do not provide any efficient method of generating a multi-dimensional rotated constellation (a multi-dimensional rotation matrix) for digital modulation with a high degree of modulation diversity with respect to various constellation sizes.

NPL 2 introduces an approach that makes use of a Givens rotation. The problem with this approach is that the number of parameters for generating an optimal multi-dimensional rotated constellation increases by the order of the square of the number of dimensions in the constellation.

NPL 3 introduces two approaches. The first approach makes use of canonical embedding. According to this approach, the method of generating a multi-dimensional rotation matrix is uniquely determined based on the number of dimensions, and does not have a parameter enabling the optimization for different constellation sizes. Therefore, the problem with this approach is that it does not allow maximizing the effect of modulation diversity for various constellation sizes.

The second approach introduced by NPL 3 generates a multi-dimensional rotation matrix having a larger number of dimensions by using stacked expansion where 2-D and 3-D rotation matrices are stacked. The problem with this approach is that the algebraic relationships between the stacked rotation matrices become more complicated as the number of dimensions increases, rendering the optimization difficult.

It is the object of the present invention to provide an efficient method of generating a multi-dimensional rotated constellation (a multi-dimensional rotation matrix) for digital transmission with a high degree of modulation diversity with respect to various constellation sizes. It is also the object of the present invention to provide a transmission apparatus and a transmission method for transmitting data based on the multi-dimensional rotated constellation obtained by using the above method, and a reception apparatus and a reception method for receiving data based on the multi-dimensional rotated constellation obtained by using the above method.

Solution to Problem

A transmission apparatus of the present invention transmits a block of data over a plurality of transmission channels. The transmission apparatus comprises: a modulator operable to select one of a plurality of constellation points in accordance with the block of data to be transmitted, each of the plurality of constellation points having a plurality of components; and a transmitter operable to transmit each component of the selected constellation point over a different one of the plurality of transmission channels, wherein (i) the plurality of constellation points are defined by positions thereof within an N-dimensional space, the positions being obtained by applying an orthogonal transformation to a subset of
$\mathbb{Z}^N$,
which is an N-dimensional integer lattice, (ii) N is a multiple of four, and (iii) the orthogonal transformation has an N-by-N matrix representation with absolute values of all elements on a main diagonal equal to a first value, and with absolute values of all elements not on the main diagonal equal to a non-zero second value.

Advantageous Effects of Invention

The above transmission apparatus allows efficiently generating a multi-dimensional rotated constellation (a multi-dimensional rotation matrix) for digital transmission with a high degree of modulation diversity with respect to various constellation sizes. Due to the multi-dimensional rotated constellation obtained by using the generated multi-dimensional rotation matrix, the above transmission apparatus also enables data transmission that yields the effect of a high-degree of modulation diversity.

BRIEF DESCRIPTION OF DRAWINGS

FIG. 5 is an illustration of the inputs to and the outputs of a rotated constellation demapper.
FIG. 6A shows an example of a conventional 16-QAM constellation with Gray encoding.

DESCRIPTION OF EMBODIMENTS

Figure 1A:
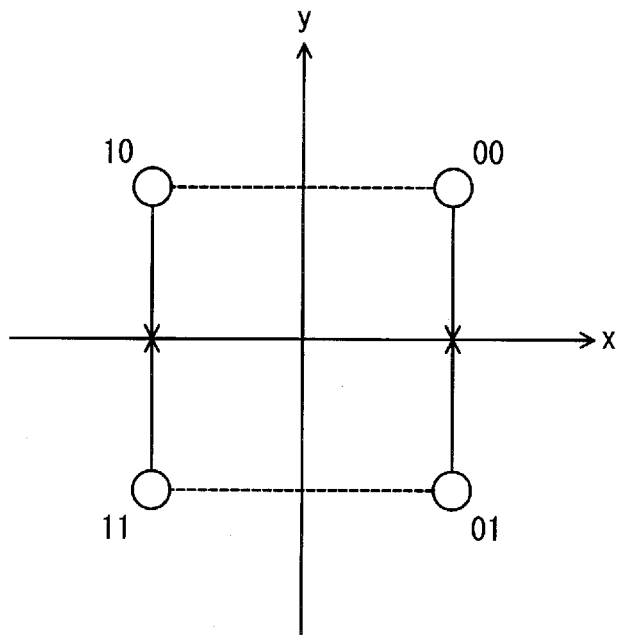
FIG. 1A illustrates an example constellation in 2D and the effect of fading.
Figure 1B:
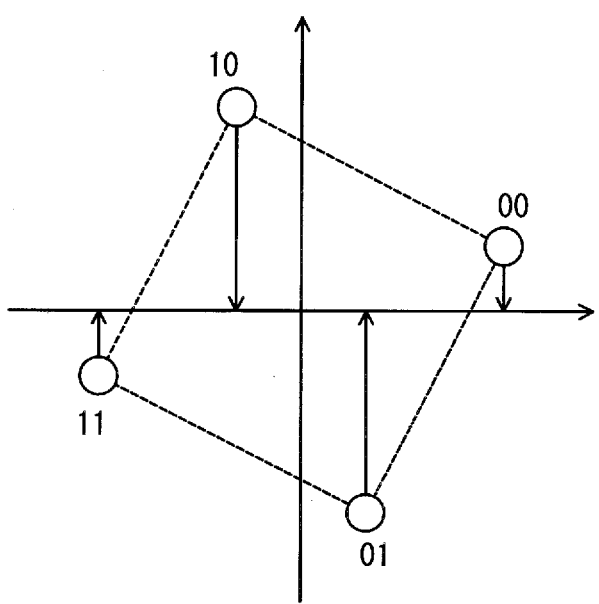
FIG. 1B illustrates an example constellation in 2D that is obtained by rotating the constellation of FIG. 1A and the effect of fading.

The present invention provides a first transmission apparatus for transmitting a block of data over a plurality of transmission channels, the first transmission apparatus comprising: a modulator operable to select one of a plurality of constellation points in accordance with the block of data to be transmitted, each of the plurality of constellation points having a plurality of components; and a transmitter operable to transmit each component of the selected constellation point over a different one of the plurality of transmission channels, wherein (i) the plurality of constellation points are defined by positions thereof within an N-dimensional space, the positions being obtained by applying an orthogonal transformation to a subset of
$\mathbb{Z}^N$,
which is an N-dimensional integer lattice, (ii) N is a multiple of four, and (iii) the orthogonal transformation has an N-by-N matrix representation with absolute values of all elements on a main diagonal equal to a first value, and with absolute values of all elements not on the main diagonal equal to a non-zero second value.

The present invention also provides a first transmission method for transmitting a block of data over a plurality of transmission channels, the first transmission method comprising the steps of: selecting one of a plurality of constellation points in accordance with the block of data to be transmitted, each of the plurality of constellation points having a plurality of components; and transmitting each component of the selected constellation point over a different one of the plurality of transmission channels, wherein (i) the plurality of constellation points are defined by positions thereof within an N-dimensional space, the positions being obtained by applying an orthogonal transformation to a subset of
$\mathbb{Z}^N$,
which is an N-dimensional integer lattice, (ii) N is a multiple of four, and (iii) the orthogonal transformation has an N-by-N matrix representation with absolute values of all elements on a main diagonal equal to a first value, and with absolute values of all elements not on the main diagonal equal to a non-zero second value.

The above transmission apparatus and transmission method allow efficiently generating a multi-dimensional rotated constellation (a multi-dimensional rotation matrix) for digital transmission with a high degree of modulation diversity with respect to various constellation sizes. Due to the multi-dimensional rotated constellation obtained by using the generated multi-dimensional rotation matrix, the above transmission apparatus and transmission method also enable data transmission that yields the effect of a high-degree of modulation diversity.

The present invention also provides a second transmission apparatus and a second transmission method, which are the first transmission apparatus and the second transmission apparatus, respectively, wherein instead of the N-by-N matrix representation, the orthogonal transformation has a matrix representation obtained by permuting rows and/or columns in the N-by-N matrix representation.

The above structure produces the same effect as the effect produced by the N-by-N matrix representation with absolute values of all elements on the main diagonal equal to a first value, and with absolute values of all elements not on the main diagonal equal to a non-zero second value.

The present invention also provides a third transmission apparatus, which is the first transmission apparatus further comprising a mapper operable to map each component of the selected constellation point to the corresponding one of the plurality of transmission channels over which the component is to be transmitted, such that fading of each of the plurality of transmission channels is uncorrelated with fading of any other one of the plurality of transmission channels.

The present invention also provides a third transmission method, which is the first transmission method further comprising the step of mapping each component of the selected constellation point to the corresponding one of the plurality of transmission channels over which the component is to be transmitted, such that fading of each of the plurality of transmission channels is uncorrelated with fading of any other one of the plurality of transmission channels.

The above structure can optimize the transmission performance, even in the presence of fading.

The present invention also provides a fourth transmission apparatus, which is the first transmission apparatus wherein the transmitter is adapted for transmitting each component of the selected constellation point over a different one of a plurality of time slots, frequencies, transmitter antennas, or combinations thereof.

The present invention also provides a fifth transmission apparatus and a fourth transmission method, which are the first transmission apparatus and the first transmission method, respectively, wherein the plurality of transmission channels comprise a plurality of different carriers in an orthogonal frequency-division multiplexing scheme.

The present invention also provides a sixth transmission apparatus and a fifth transmission method, which are the first transmission apparatus and the first transmission method, respectively, wherein the plurality of transmission channels comprise a plurality of different symbols in an orthogonal frequency-division multiplexing scheme.

The present invention also provides a first reception apparatus for receiving a block of data over a plurality of transmission channels, the first reception apparatus comprising: a receiver operable to receive a plurality of component signals over the plurality of transmission channels; and a demodulator operable to select one of a plurality of constellation points in accordance with the plurality of received component signals, wherein (i) the plurality of constellation points are defined by positions thereof within an N-dimensional space, the positions being obtained by applying an orthogonal transformation to a subset of
$\mathbb{Z}^N$,
which is an N-dimensional integer lattice, (ii) N is a multiple of four, and (iii) the orthogonal transformation has an N-by-N matrix representation with absolute values of all elements on a main diagonal equal to a first value, and with absolute values of all elements not on the main diagonal equal to a non-zero second value.

The present invention also provides a first reception method for receiving a block of data over a plurality of transmission channels, the first reception method comprising the steps of: receiving a plurality of component signals over the plurality of transmission channels; and selecting one of a plurality of constellation points in accordance with the plurality of received component signals, wherein (i) the plurality of constellation points are defined by positions thereof within an N-dimensional space, the positions being obtained by applying an orthogonal transformation to a subset of
$\mathbb{Z}^N$,
which is an N-dimensional integer lattice, (ii) N is a multiple of four, and (iii) the orthogonal transformation has an N-by-N matrix representation with absolute values of all elements on a main diagonal equal to a first value, and with absolute values of all elements not on the main diagonal equal to a non-zero second value.

The above reception apparatus and reception method allow efficiently generating a multi-dimensional rotated constellation (a multi-dimensional rotation matrix) for digital transmission with a high degree of modulation diversity with respect to various constellation sizes. Due to the multi-dimensional rotated constellation obtained by using the generated multi-dimensional rotation matrix, the above reception apparatus and reception method also enable data reception that yields the effect of a high-degree of modulation diversity.

The present invention also provides a second reception apparatus and a second reception method, which are the first reception apparatus and the first reception method, respectively, wherein instead of the N-by-N matrix representation, the orthogonal transformation has a matrix representation obtained by permuting rows and/or columns in the N-by-N matrix representation.

The above structure produces the same effect as the effect produced by the N-by-N matrix representation with absolute values of all elements on the main diagonal equal to a first value, and with absolute values of all elements not on the main diagonal equal to a non-zero second value.

The present invention also provides a third reception apparatus and a third reception method, which are the first reception apparatus and the first reception method, respectively, wherein the plurality of transmission channels comprise a plurality of different carriers in an orthogonal frequency-division multiplexing scheme.

The present invention also provides a fourth reception apparatus and a fourth reception method, which are the first reception apparatus and the first reception method, respectively, wherein the plurality of transmission channels comprise a plurality of different symbols in an orthogonal frequency-division multiplexing scheme.

The present invention also provides a first generation method for generating a multi-dimensional constellation for a digital modulation scheme in a data communication system, the first generation method comprising the steps of: receiving a plurality of vectors of a multi-dimensional vector space; and obtaining constellation points of the multi-dimensional constellation by applying an orthogonal transformation to the plurality of vectors received, wherein (i) the orthogonal transformation is adapted for increasing a minimum number of different values in components of any two distinct multi-dimensional constellation points relative to a minimum number of different values in components of any two distinct vectors received, and (ii) the orthogonal transformation has an N-by-N matrix representation, N being a multiple of four, with absolute values of all elements on a main diagonal equal to a first value, and with absolute values of all elements not on the main diagonal equal to a non-zero second value.

The above generation method allows efficiently generating a multi-dimensional rotated constellation (a multi-dimensional rotation matrix) for digital transmission with a high degree of modulation diversity with respect to various constellation sizes.

The present invention also provides a second generation method for generating a multi-dimensional constellation, the second generation method being the first generation method wherein instead of the N-by-N matrix representation, the orthogonal transformation has a matrix representation obtained by permuting rows and/or columns in the N-by-N matrix representation.

The above structure produces the same effect as the effect produced by the N-by-N matrix representation with absolute values of all elements on the main diagonal equal to a first value, and with absolute values of all elements not on the main diagonal equal to a non-zero second value.

The present invention also provides a third generation method for generating a multi-dimensional constellation, the third generation method being the first generation method further comprising the steps of: selecting a rotation factor r as a real number between 0 and 1; calculating the first value, a, by evaluating an expression $$a = \sqrt{1 - \frac{r(N-1)}{N}};$$

calculating the second value, b, by evaluating an expression $$b = \sqrt{\frac{r}{N}};$$

and determining the orthogonal transformation by selecting a sign value $s_{i,j}$ for each element (i,j) of a matrix representation $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix},$$

such that the matrix representation is orthogonal.

With the above structure, the orthogonal transformation can be easily determined.

The present invention also provides a fourth generation method for generating a multi-dimensional constellation, the fourth generation method being the third generation method wherein the selected rotation factor r maximizes the minimum number of different values in the components of any two distinct multi-dimensional constellation points.

The above structure makes it possible to achieve a high-degree of modulation diversity and therewith increased robustness in the presence of fading, while preserving spectral efficiency.

The present invention also provides a fifth generation method for generating a multi-dimensional constellation, the fifth generation method being the first generation method wherein the plurality of vectors received represent a subset of $\mathbb{Z}^N$,
which is an N-dimensional integer lattice.

The above structure is useful in a straightforward numerical implementation.

The following describes an embodiment of the present invention with reference to the drawings.

First, a description is now given of proposed multi-dimensional rotation matrices.

Multi-dimensional rotation matrices have a single independent parameter and a structure that is as regular as possible. The parameter can be configured in order to minimize the error probability for various constellation sizes. Specifically, the following two conditions (i) and (ii) are imposed on the multi-dimensional rotation matrix employed for obtaining a multi-dimensional rotated constellation.

(i) Each output must have a dominant input.
(ii) The remaining inputs must have equal weights.

The above conditions (i) and (ii) are fulfilled if the multi-dimensional rotation matrix is of the form shown in the following Math. 19 (for N=4), or more generally, of the form shown in the following Math. 20. Note that the multi-dimensional rotation matrix shown in Math. 20 is an N-by-N matrix.

$$R = \begin{pmatrix} s_{1,1}a & s_{1,2}b & s_{1,3}b & s_{1,4}b \\ s_{2,1}b & s_{2,2}a & s_{2,3}b & s_{2,4}b \\ s_{3,1}b & s_{3,2}b & s_{3,3}a & s_{3,4}b \\ s_{4,1}b & s_{4,2}b & s_{4,3}b & s_{4,4}a \end{pmatrix} \quad [\text{Math. 19}]$$

$$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix} \quad [\text{Math. 20}]$$

Here, a and b denote real parameters, with each sign value $s_{i,j}$ satisfying $$s_{i,j} \in \{-1,+1\}.$$

Note that values of the parameters a and b that fulfill the above conditions (i) and (ii) satisfy a relational expression a>b>0.

Obviously, the same advantages can be achieved by permuting rows and/or columns of the multi-dimensional rotation matrix shown in the above Math. 20. Therefore, the matrix shown in Math. 20 can be used as the multi-dimensional rotation matrix. Alternatively, it is also possible to use a matrix obtained by permuting rows and/or columns of the matrix shown in Math. 20 as the multi-dimensional rotation matrix. The matrix shown in Math. 20 and the matrix obtained by permuting rows and/or columns of the matrix shown in Math. 20 have the following features: (i) each row contains an element having a real parameter a; (ii) each column contains an element having a real parameter a; and (iii) the rest of the elements in each row/column have a real parameter b.

The following describes normalization of the multi-dimensional rotation matrix shown in the above Math. 20. Note that similar normalization can be performed on a matrix (a multi-dimensional rotation matrix) obtained by permuting rows and/or columns of the matrix shown in Math. 20.

The normalization condition establishes the relationship shown in the following Math. 21 between parameters a and b.

$$a^2 + (N-1)b^2 = 1 \quad \text{[Math. 21]}$$

Therefore, the multi-dimensional rotation matrix has only one independent parameter. In the following Math. 22, we define a "rotation factor" r between 0 and 1.

$$\text{No rotation: } r=0 \rightarrow b=0, a=1$$

$$\text{Maximum rotation: } r=0 \rightarrow b=a=\sqrt{1/N} \quad \text{[Math. 22]}$$

Therefore, the parameters a and b can be expressed in terms of the "rotation factor" r as shown in the following Math. 23.

$$a = \sqrt{1 - \frac{r(N-1)}{N}},$$
$$b = \sqrt{\frac{r}{N}} \quad \text{[Math. 23]}$$

The advantage of using the "rotation factor" r is that the range is always 0 to 1 regardless of the number of dimensions. The optimal value for the "rotation factor" r depends on the constellation size, that is, the number of dimensions N and the number of bits B per dimension for square/cubic constellations. Note that the value of r satisfying the above conditions (i) and (ii) is greater than 0 and smaller than 1.

The multi-dimensional rotation matrix for rotating a multi-dimensional constellation may be normalized or unnormalized.

The only open issue is what values the sign matrix
S
should take. The sign matrix
S
is defined by the following Math. 24.

$$S = \begin{pmatrix} s_{1,1} & \cdots & s_{1,N} \\ \vdots & \ddots & \vdots \\ s_{N,1} & \cdots & s_{N,N} \end{pmatrix} \quad \text{[Math. 24]}$$

A necessary condition, which is not sufficient however, is that the sign matrix
S
must be orthogonal, up to a scaling factor. Such matrices are known in the literature as the Hadamard matrices. Because a and b in the multi-dimensional rotation matrix
R
are different, the additional condition shown in the following Math. 25 must be imposed.

$$s_{i,j} = -s_{j,i} s_{j,j} \text{ for all } i \neq j \quad \text{[Math. 25]}$$

This condition ensures that any a*b product cancels out with the corresponding b*a product.

If all elements on the main diagonal have the same sign, and each pair of elements that are symmetrical with respect to the main diagonal have opposite signs, this condition is fulfilled. Examples of such particularly preferred sign matrices for the 4-D and 8-D (eight-dimensional) cases are shown in the following Math. 26 and Math. 27, respectively.

$$S = \begin{pmatrix} +1 & -1 & -1 & -1 \\ +1 & +1 & -1 & +1 \\ +1 & +1 & +1 & -1 \\ +1 & -1 & +1 & +1 \end{pmatrix} \quad \text{[Math. 26]}$$

$$S = \begin{pmatrix} +1 & -1 & -1 & -1 & -1 & -1 & -1 & -1 \\ +1 & +1 & -1 & +1 & -1 & +1 & -1 & +1 \\ +1 & +1 & +1 & -1 & -1 & -1 & +1 & +1 \\ +1 & -1 & +1 & +1 & -1 & +1 & +1 & -1 \\ +1 & +1 & +1 & +1 & +1 & -1 & -1 & -1 \\ +1 & -1 & +1 & -1 & +1 & +1 & -1 & +1 \\ +1 & +1 & -1 & -1 & +1 & +1 & +1 & -1 \\ +1 & -1 & -1 & +1 & +1 & -1 & +1 & +1 \end{pmatrix} \quad \text{[Math. 27]}$$

It is to be noted that Hadamard matrices are only possible for sizes that are multiples of four. Therefore, multi-dimensional rotation matrices exist only for numbers of dimensions that are multiples of four. Thus, the number of dimensions of a constellation according to the present invention is preferably a multiple of four (e.g., 4, 8, 12 and 16).

Once the sign matrix
S
has been fixed, the resulting multi-dimensional rotation matrix
R
may be optimized for a certain constellation size, i.e., the number of bits or constellation points per dimension, by performing the following steps: selecting the "rotation factor" r accordingly; and calculating parameters a and b by substituting the selected "rotation factor" r into the above Math. 23. To this end, any suitable optimization algorithm may be employed. As an optimization target, the minimum number of different values in the components of any two distinct multi-dimensional rotated constellation points may be employed. Other optimization targets may be used as well. According to a preferred embodiment of the present invention, a cost function is defined that takes the minimum absolute differences between corresponding components of any two distinct multi-dimensional rotated constellation points into account. An example of such a cost function calculates the minimum over all N absolute differences between corresponding components of two multi-dimensional rotated constellation points and sums these minimum values, or their squares over all pairs of multi-dimensional rotated constellation points.

The multi-dimensional rotated constellation may already be useful if the minimum number of different values in the components of any two distinct multi-dimensional rotated constellation points is larger than that pertaining to the multi-dimensional unrotated constellation. Also, the multi-dimensional rotated constellation may already be useful if the minimum absolute difference of two corresponding components of any two distinct multi-dimensional rotated constellation points is larger than that pertaining to the multi-dimensional unrotated constellation.

In a preferred embodiment of the present invention, the entire transmission process including the transmission channel and the decoder is simulated in order to determine the bit error rate. The "rotation factor" r may then be adapted so as to minimize the determined bit error rate.

Hence, the present invention allows generating a multi-dimensional rotated constellation that can be used for modulating and transmitting data over a plurality of fading (sub-) channels or slots at optimum spectral efficiency. To this end, a conventional hyper-cubic constellation with the desired number of dimensions N and the desired number of bits per dimension (i.e., the number of constellation points per direction) is set up, for instance, by selecting an appropriate subset of $\mathbb{Z}^N$, which is the N-dimensional integer lattice. Here, $\mathbb{Z}^N$ is the set of all points of the N-dimensional space having integer coordinates. This hyper-cubic constellation may, for instance, be a generalization of a conventional regular QAM constellation to N dimensions. However, other initial constellations may be used, such as generalizations of circular constellation to N dimensions, and so on.

Once the initial constellation is fixed, it may be subjected to a rotation by applying the above defined multi-dimensional rotation matrix

R to each of the initial constellation points so as to obtain a rotated set of constellation points, i.e., a multi-dimensional rotated constellation. The multi-dimensional rotated constellation may be more favorable than the initial constellation in terms of the degree of modulation diversity provided, depending on the particular choice of the "rotation factor" r. The "rotation factor" r, and therewith the rotated constellation, may be varied, as described above, so as to obtain a constellation that provides maximum modulation diversity, or at least a certain minimum degree of modulation diversity, as required by the specific application.

The present invention also provides a method and an apparatus for efficiently transmitting and receiving data over a plurality of fading (sub-) channels or slots on the basis of a modulation scheme that employs a multi-dimensional rotated constellation as obtained by the above described method. The inventive method or apparatus may either perform the above described method in order to obtain the desired multi-dimensional rotated constellation, or use a set of predefined and prestored constellation points of the multi-dimensional rotated constellation that have been calculated using the above described method. In the latter case, the inventive method or apparatus may access a storage means, wherein information indicating the positions of at least some of the constellation points is stored.

Another aspect of the present invention concerns the separation and mapping of the N dimensions of the N-dimensional rotated constellation so that they experience independent fading during transmission. This is a key aspect necessary for achieving the expected diversity performance.

Generally, this can be achieved by transmitting each of the N components of a constellation point of an N-dimensional rotated constellation over a different one of a plurality of transmission channels, provided that fading of each of these transmission channels is uncorrelated with fading of any other one of the transmission channels. Here, the phrase "a different one of a plurality of transmission channels" may refer to a different one of a plurality of time slots, frequencies, transmitter antennas, or combinations thereof. In the context of orthogonal frequency-division multiplexing (OFDM), the phrase "a different one of a plurality of transmission channels" may in particular refer to a different one of a plurality of active carriers, OFDM symbols, or combinations thereof. In the context of a single carrier system, the phrase "a different one of a plurality of transmission channels" may in particular refer to a different one of a plurality of symbols or time slots.

Further signal processing is possible before transmission. The critical aspect is that fading experienced by each of the N dimensions must be different from, or ideally uncorrelated with, fading experienced by any other one of the N dimensions.

The spreading of the N dimensions across different time slots, frequencies, and transmitter antennas can be achieved for example through appropriate interleaving and mapping.

Another aspect of the present invention concerns the mapping of the N real dimensions of the N-dimensional rotated constellation to complex symbols for transmission. Since fading of the in-phase component and the quadrature component of a given channel is typically identical, a complex symbol may not be made up of two different components of the same constellation point. Instead, the N components of a constellation point must be mapped to different complex symbols in order to ensure the desired diversity.

The complex symbols generated in this manner are then spread in a conventional manner over the available time slots, frequencies, and/or antennas, e.g. through interleaving and mapping, so that fading experienced by each of the N dimensions is uncorrelated with fading experienced by any other one of the N dimensions.

The following describes an example flow of a method for generating a multi-dimensional constellation for a digital modulation scheme in data transmission. This flow is achieved by, for example, a computer system. Each of the following steps is executed by a central processing unit (CPU).

(Step 1) A plurality of vectors of an N-dimensional vector space are received. Note, for example, the plurality of received vectors represent a subset of $\mathbb{Z}^N$, which is an N-dimensional integer lattice.

(Step 2) Sign values $s_{i,j}$ of the sign matrix shown in the above Math. 24 are determined, such that the N-dimensional rotation matrix

R shown in the above Math. 20 is orthogonal.

(Step 3) A "rotation factor" r is selected as a real number between 0 and 1. It should be noted that the "rotation factor" r, for example, is selected so that it maximizes the minimum number of different values in the components of any two distinct multi-dimensional constellation points. However, the present invention is not limited to this. Alternatively, the "rotation factor" r may be selected so that it increases a minimum number of different values in components of any two distinct N-dimensional rotated constellation points relative to a minimum number of different values in components of any two distinct vectors received in Step 1.

(Step 4) Values of the parameters a and b are calculated by substituting the value of the "rotation factor" r, which has been selected in Step 3, into the above Math. 23.

(Step 5) The N-dimensional rotation matrix

R is determined from the above Math. 20 by using (i) the sign matrix

S having the sign values $s_{i,j}$ determined in Step 2, and (ii) the values of the parameters a and b calculated in Step 4.

(Step 6) A constellation point of the N-dimensional rotated constellation is obtained by applying the N-dimensional rotation matrix

R determined in Step 5 to the plurality of vectors of the multi-dimensional vector space, which have been received in Step 1.

Figure 2:
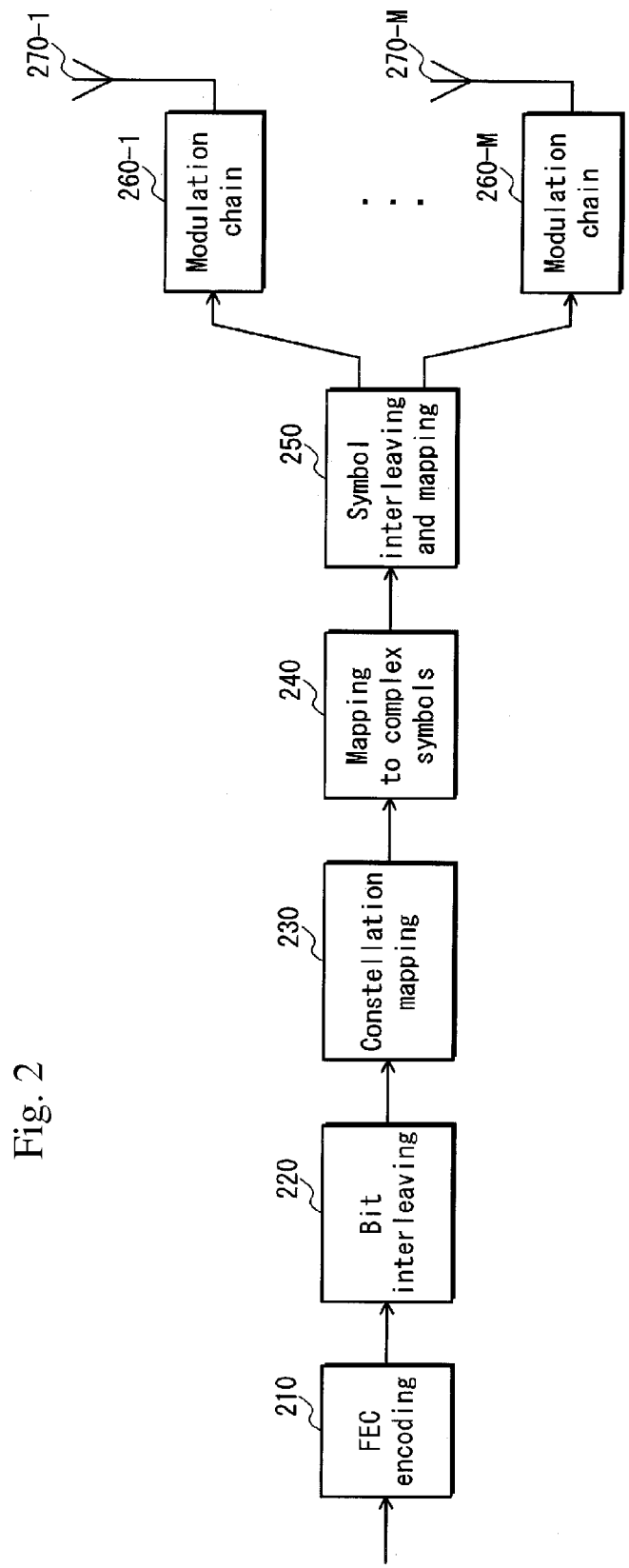
FIG. 2 shows a block diagram of a conventional transmission apparatus.
Figure 3:
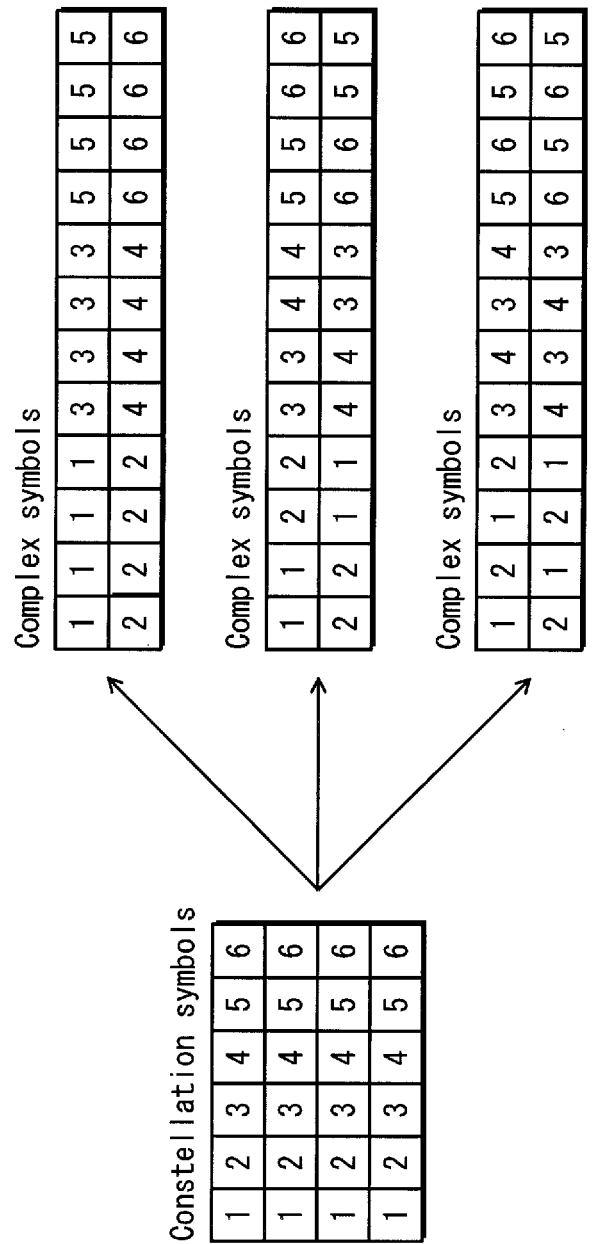
FIG. 3 is a schematic drawing illustrating the mapping of constellation symbols to complex symbols.
Figure 12:
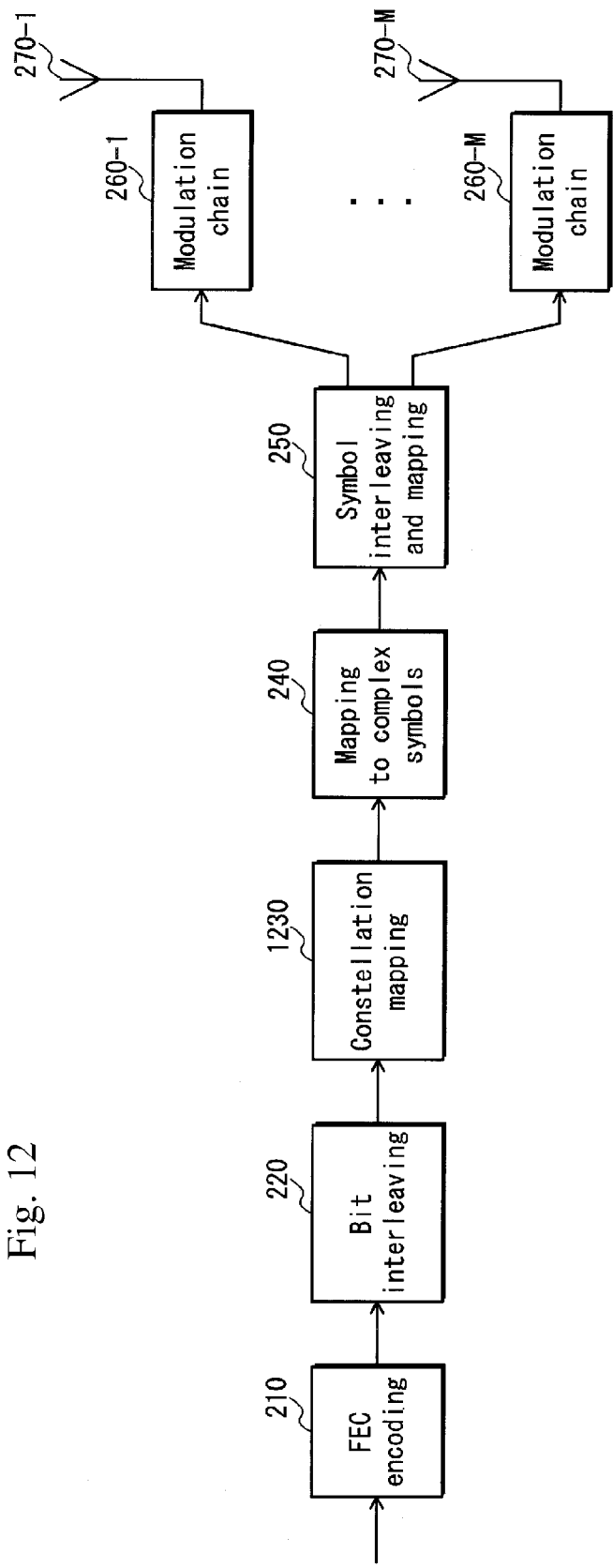
FIG. 12 shows a block diagram of a transmission apparatus according to an embodiment of the present invention.

FIG. 12 is a block diagram of a transmission apparatus according to an embodiment of the present invention, which is similar to the one shown in FIG. 2. The elements that are the same as those described above are assigned the same reference numerals thereas, and a detailed explanation thereof is omitted.

The transmission apparatus of FIG. 12 differs from that of FIG. 2 in that the rotated constellation demapper 230 is replaced with a rotated constellation demapper 1230. The rotated constellation demapper 1230 performs processing on the basis of an N-dimensional rotated constellation that has a plurality of constellation points defined by positions thereof within an N-dimensional space, the positions being obtained by applying either the N-dimensional rotation matrix shown in the above Math. 20, or an N-dimensional rotation matrix obtained by permuting rows and/or columns of the N-dimensional rotation matrix shown in the above Math. 20, to a subset of $\mathbb{Z}^N$, which is the N-dimensional integer lattice. To be more specific, this processing is to map the output of the bit interleaver 220 to the rotated constellation.

Figure 4:
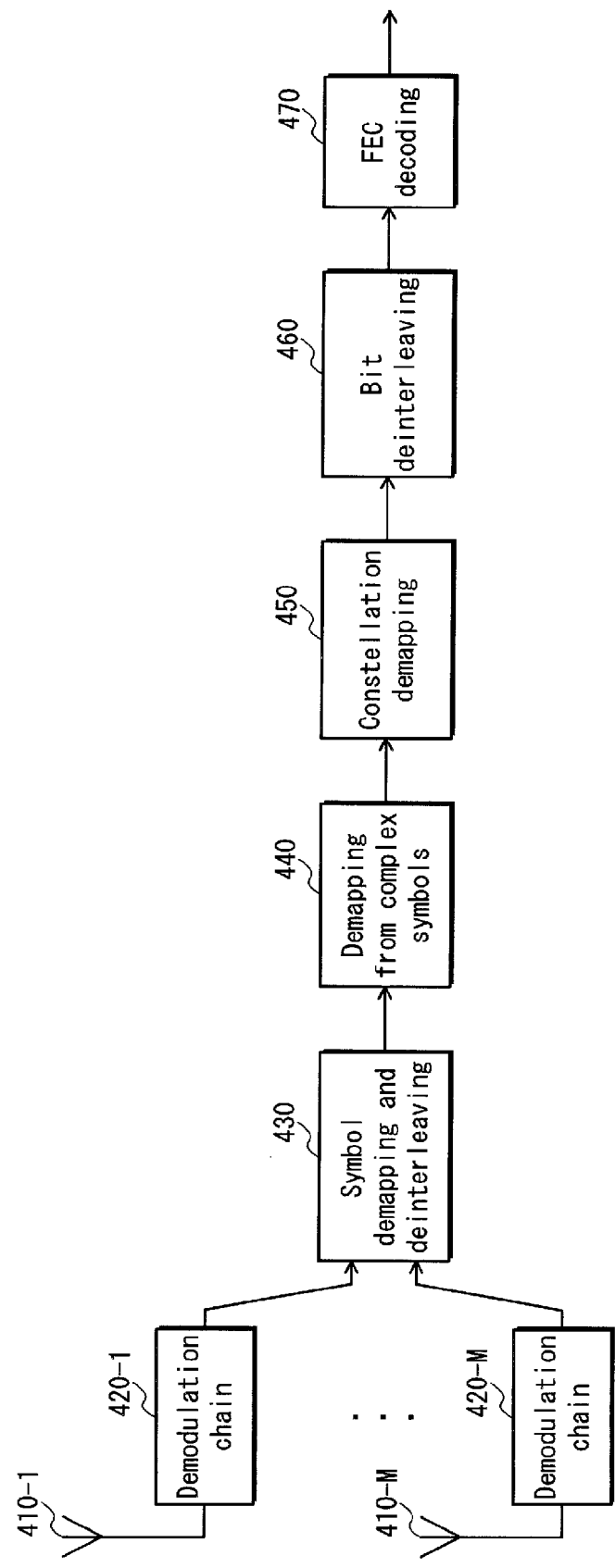
FIG. 4 is a block diagram of a conventional reception apparatus.
Figure 6B:
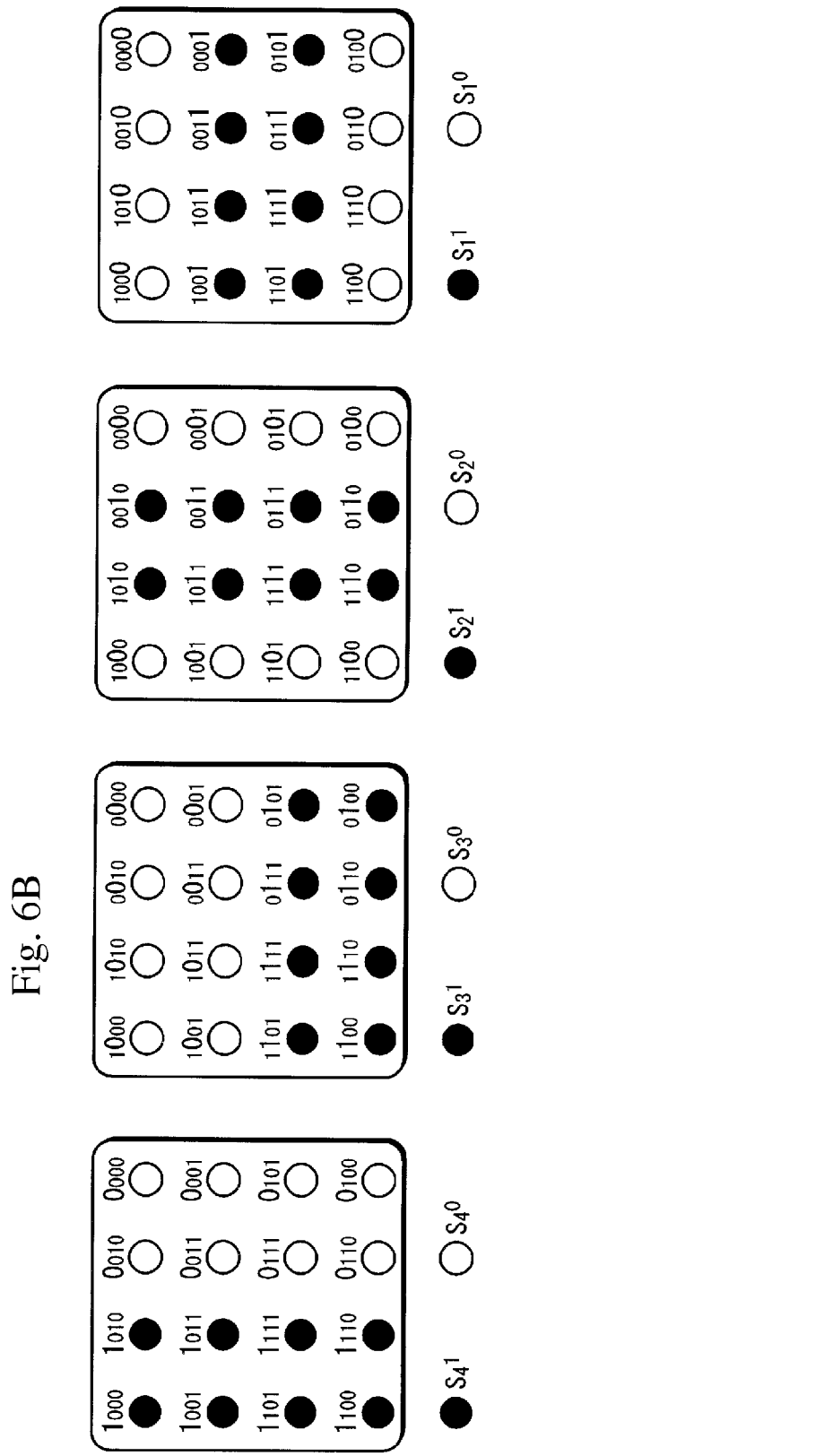
FIG. 6B illustrates the two partitions for each bit of the constellation of FIG. 6A.
Figure 13:
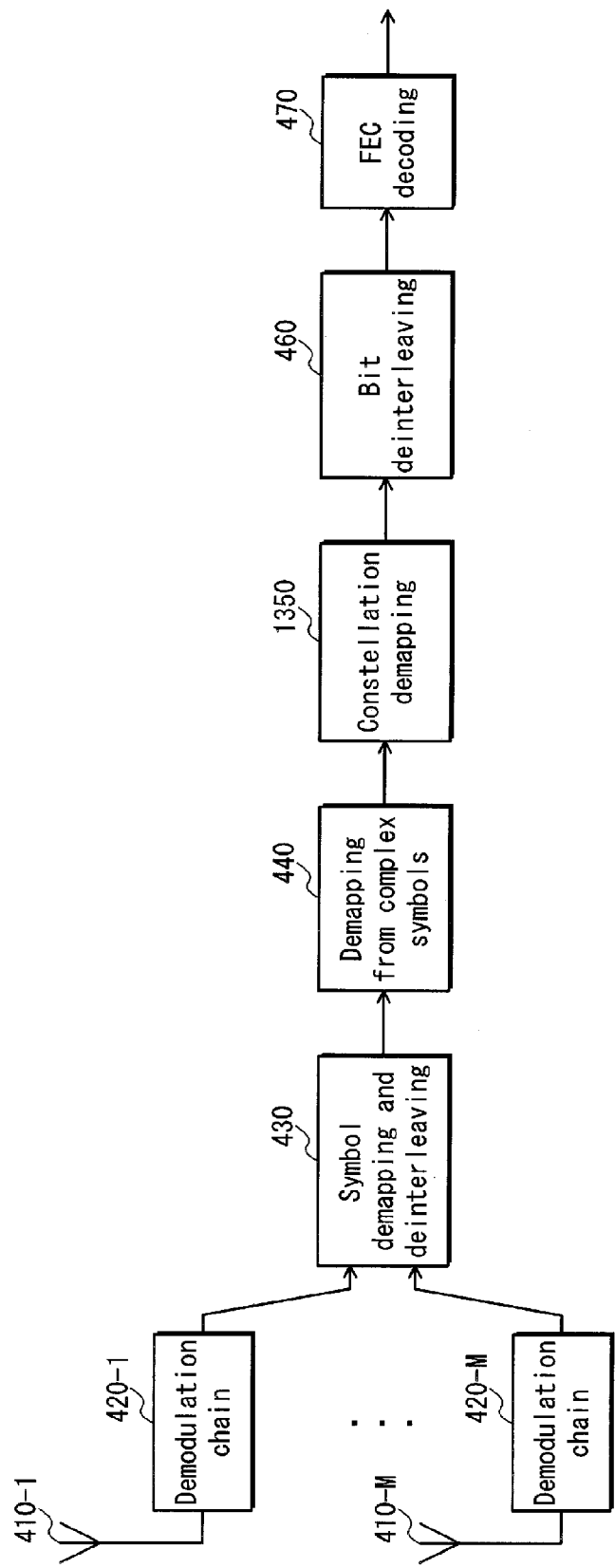
FIG. 13 shows a block diagram of a reception apparatus according to an embodiment of the present invention.

FIG. 13 is a block diagram of a reception apparatus according to an embodiment of the present invention, which is similar to the one shown in FIG. 4. The elements that are the same as those described above are assigned the same reference numerals thereas, and a detailed explanation thereof is omitted.

The reception apparatus of FIG. 13 differs from that of FIG. 4 in that the rotated constellation demapper 450 is replaced with a rotated constellation demapper 1350. The rotated constellation demapper 1350 performs processing on the basis of an N-dimensional rotated constellation that has a plurality of constellation points defined by positions thereof within an N-dimensional space, the positions being obtained by applying either the N-dimensional rotation matrix shown in the above Math. 20, or an N-dimensional rotation matrix obtained by permuting rows and/or columns of the N-dimensional rotation matrix shown in the above Math. 20, to a subset of $\mathbb{Z}^N$, which is the N-dimensional integer lattice.

Figure 7:
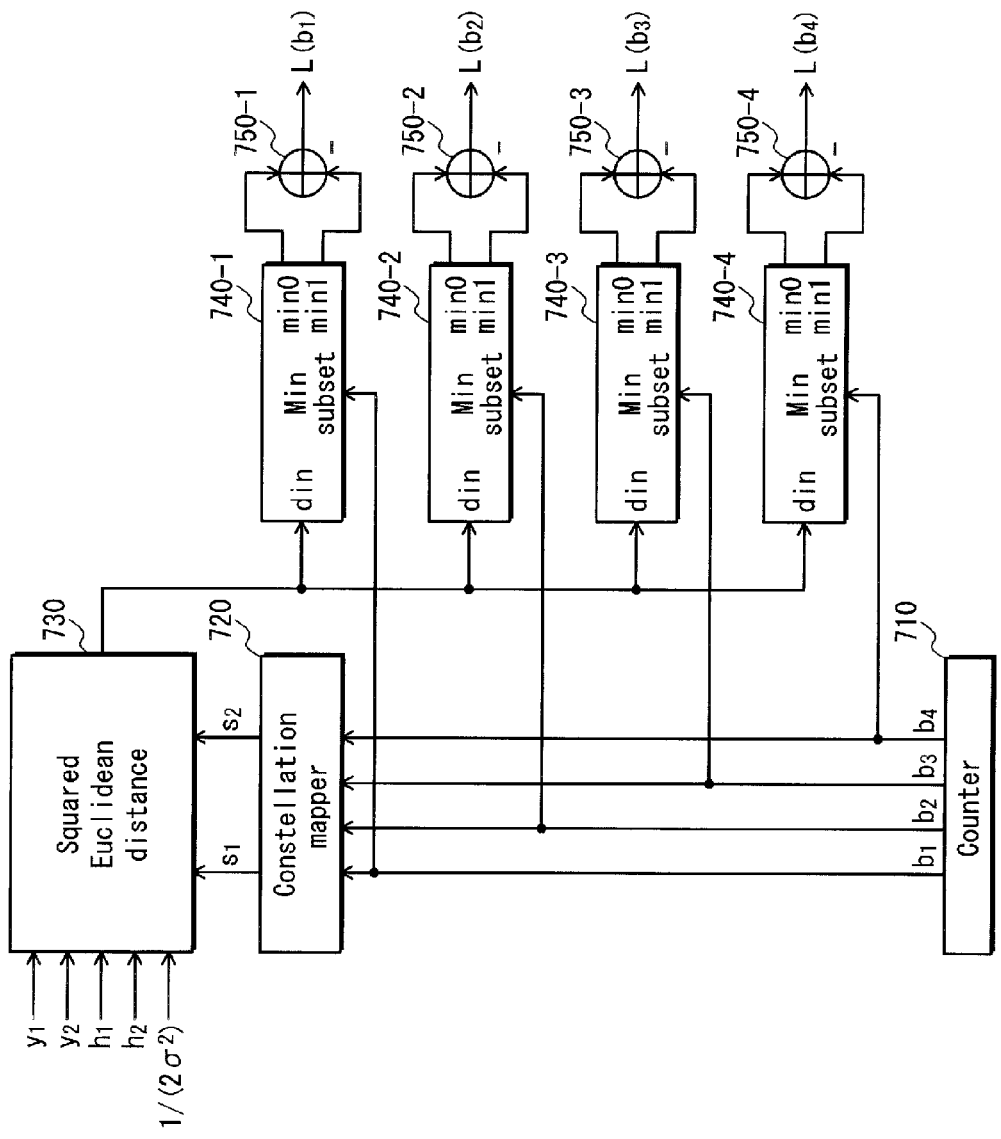
FIG. 7 shows an example hardware implementation of an LLR demapper for a 16-QAM rotated constellation.
Figure 8:
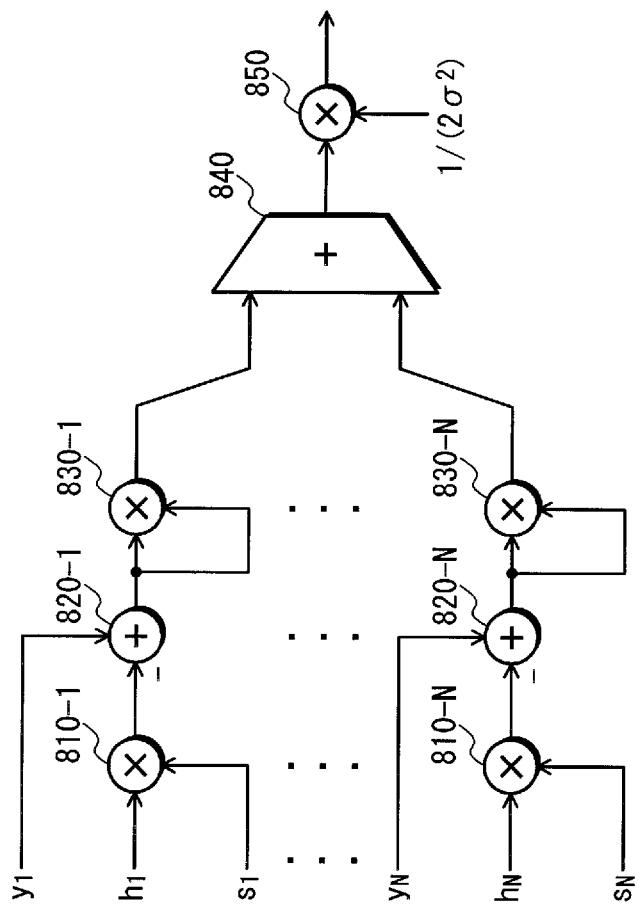
FIG. 8 shows an example hardware implementation for a squared Euclidean distance calculator that calculates the N-dimensional squared Euclidean distance.
Figure 9:
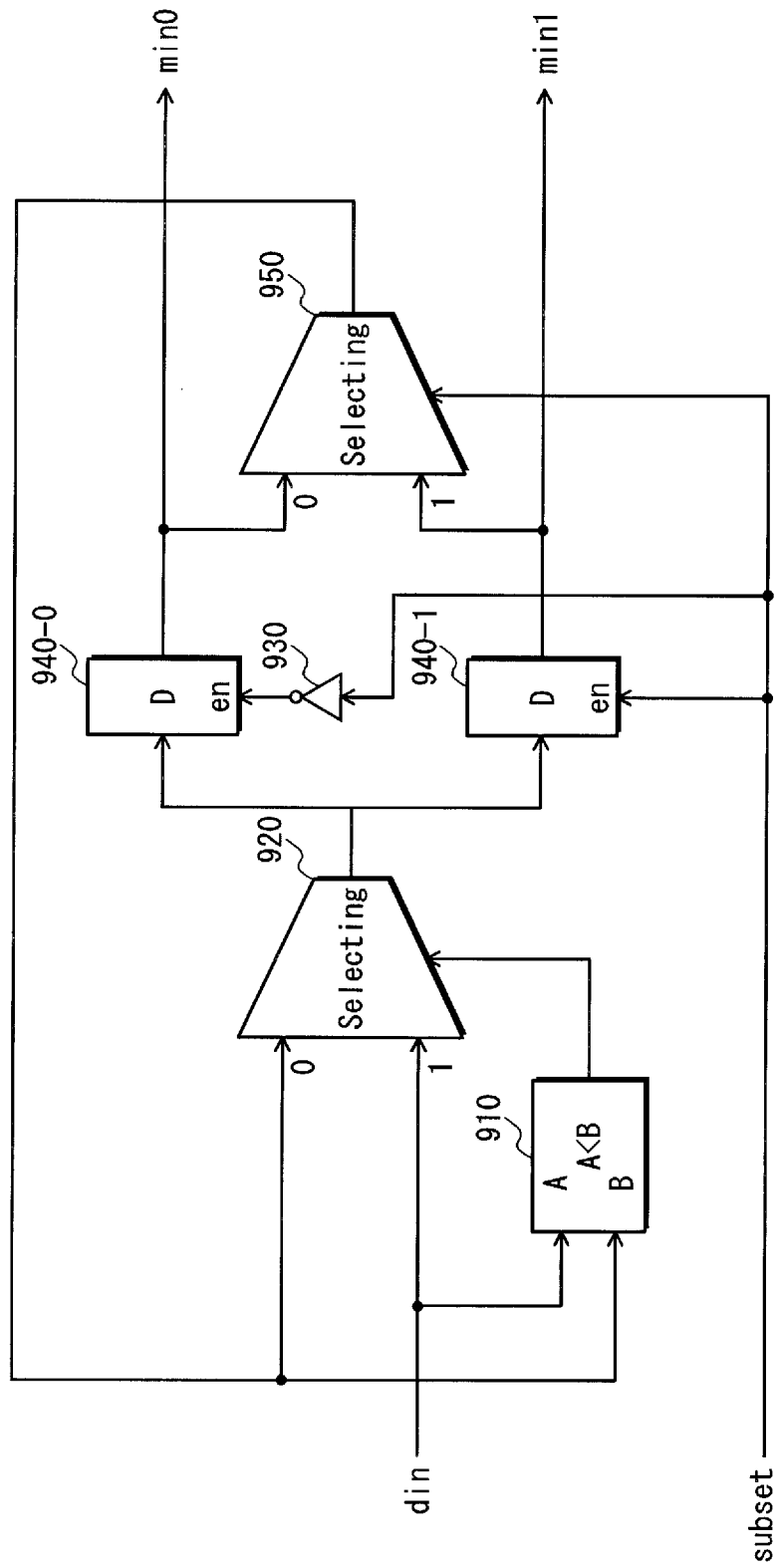
FIG. 9 shows an example hardware implementation for a minimizer that calculates the minimum squared Euclidean distances.
Figure 14:
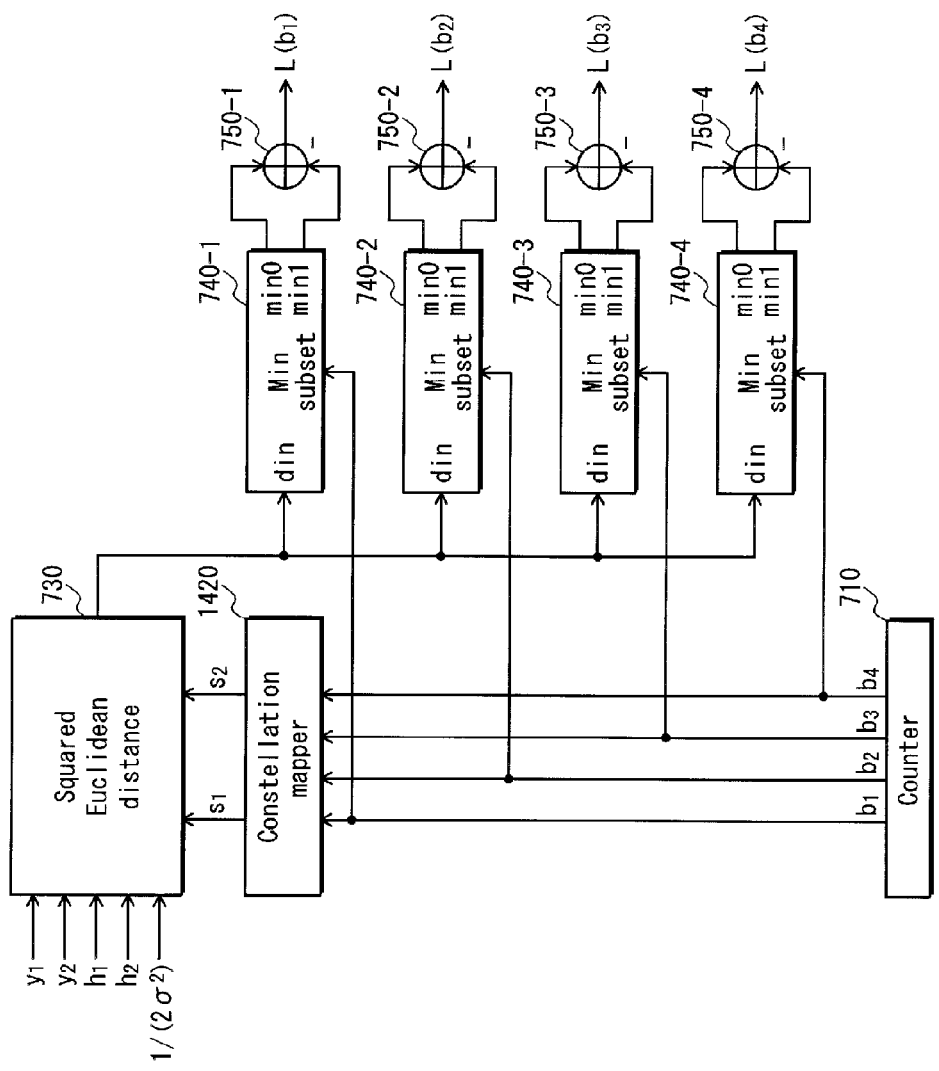
FIG. 14 is a block diagram of the rotated constellation demapper shown in FIG. 13.

FIG. 14 shows an example hardware implementation for the rotated constellation demapper 1350 of FIG. 13 for a 16-QAM rotated constellation (N=2, B=2). The rotated constellation demapper 1350 of FIG. 13 includes a rotated constellation mapper 1420, instead of the rotated constellation mapper 720 shown in FIG. 7. The rotated constellation mapper 1420 maps the outputs $b_1$ to $b_4$ from the counter 710 to an N-dimensional rotated constellation that has a plurality of constellation points defined by positions thereof within an N-dimensional space, the positions being obtained by applying either the N-dimensional rotation matrix shown in the above Math. 20, or an N-dimensional rotation matrix obtained by permuting rows and/or columns of the N-dimensional rotation matrix shown in the above Math. 20, to a subset of $\mathbb{Z}^N$, which is the N-dimensional integer lattice. Then, the rotated constellation mapper 1420 outputs the resulting constellation components $s_1$ to $s_4$ to the squared Euclidean distance calculator 730.

Figure 10:
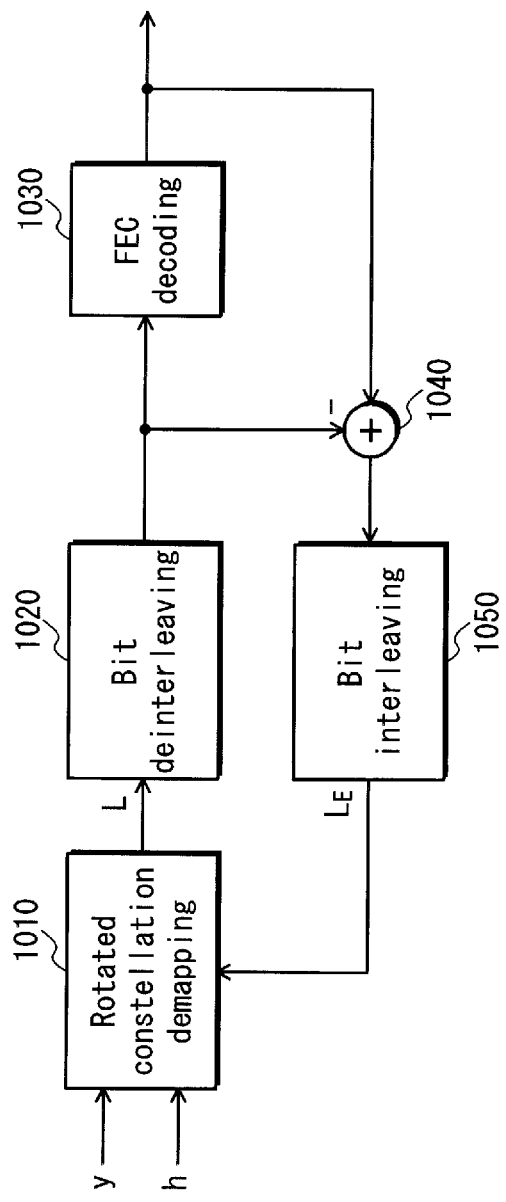
FIG. 10 shows a block diagram of a circuit that performs iterative decoding.
Figure 11:
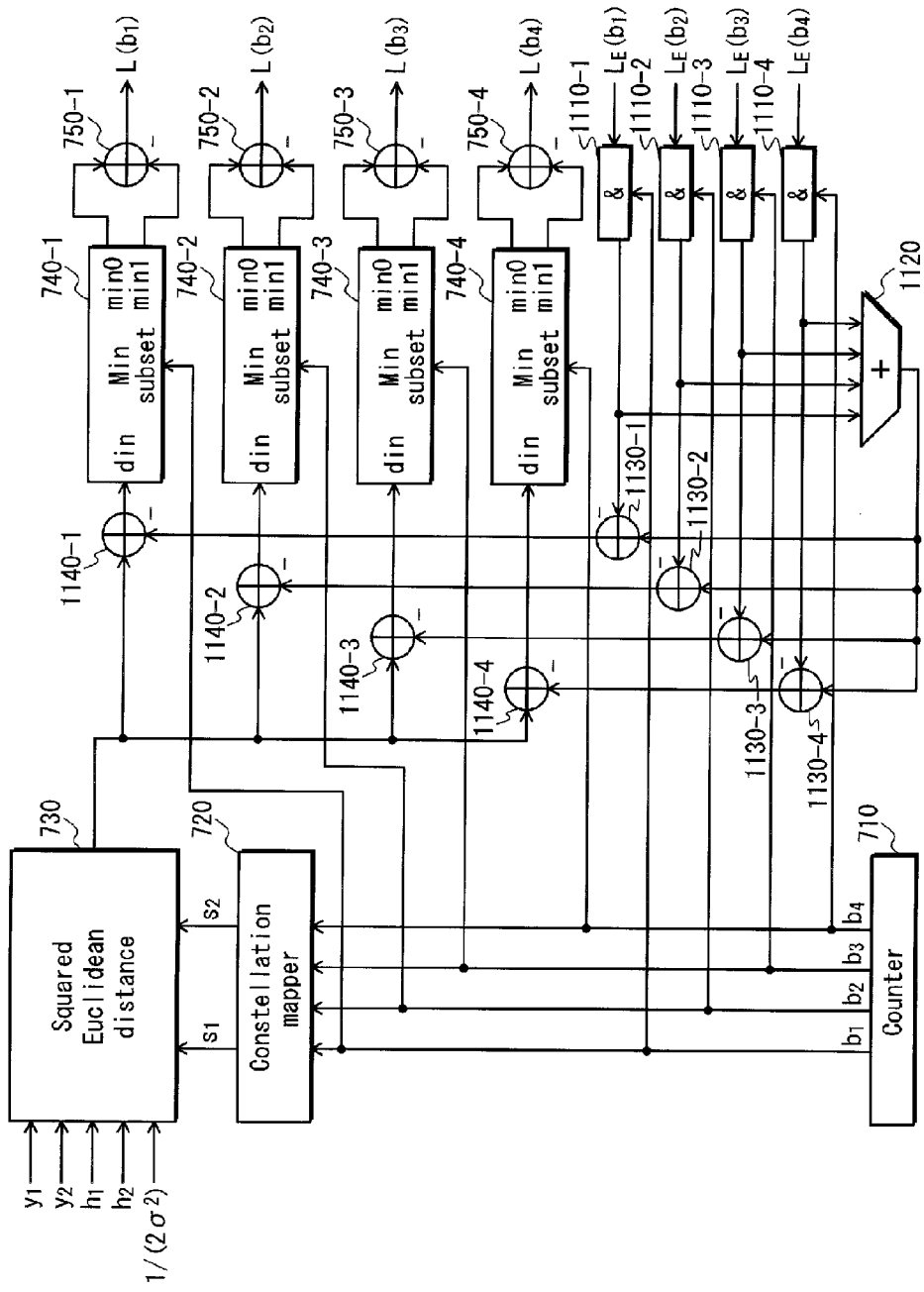
FIG. 11 shows an example hardware implementation of the rotated constellation demapper for iterative decoding.

It should be noted that the structures of the transmission apparatus and the reception apparatus are not limited to those described above. For example, the reception apparatus may have either one of the structures shown in FIGS. 10 and 11. In this case, the rotated constellation demapper 1010 or 720 performs processing on the basis of an N-dimensional rotated constellation that has a plurality of constellation points defined by positions thereof within an N-dimensional space, the positions being obtained by applying either the N-dimensional rotation matrix shown in the above Math. 20, or an N-dimensional rotation matrix obtained by permuting rows and/or columns of the N-dimensional rotation matrix shown in the above Math. 20, to a subset of $\mathbb{Z}^N$, which is the N-dimensional integer lattice.

The present invention relates to digital data communication and provides an efficient method for generating multi-dimensional constellations for digital data modulation with a high degree of modulation diversity, a method for transmitting and receiving data on the basis of such constellations, and a corresponding apparatus. This is achieved by considering only multi-dimensional rotation matrices with all elements on the diagonal having the same first absolute value and all other elements having the same second absolute value. In this manner, multi-dimensional rotation matrices can be generated having a single independent parameter and a structure that is as regular as possible. The independent parameter can be configured in order to minimize the error probability for various constellation sizes.

INDUSTRIAL APPLICABILITY

The present invention is applicable to a communication apparatus that performs modulation/demodulation by using a constellation.

REFERENCE SIGNS LIST

210 FEC encoder
220 bit interleaver
1230 rotated constellation mapper
240 complex symbol mapper
250 symbol interleaver/mapper
260-1 to 260-M modulation chain
270-1 to 270-M transmitter antenna
410-1 to 410-M receiver antenna
420-1 to 420-M demodulation chain
430 symbol demapper/deinterleaver
440 complex symbol demapper
1350 rotated constellation demapper
460 bit deinterleaver
470 FEC decoder

The invention claimed is:

1. A transmission apparatus for transmitting a block of data over a plurality of transmission channels, the transmission apparatus comprising:
    a modulator operable to generate one of a plurality of rotated constellation points in accordance with the block of data to be transmitted, each of the plurality of rotated constellation points having N components;
    a mapper operable to separate and map each of the N components of the generated rotated constellation point to a different one of a plurality of complex symbols; and
    a transmitter operable to transmit each of the complex symbols at a different time and/or at a different frequency, wherein
    the plurality of rotated constellation points are obtained by applying an orthogonal transformation to each of a plurality of initial constellation points having N components so as to increase a reception robustness under fading conditions,
    N is a multiple of four,
    the orthogonal transformation has one of (i) an N-by-N matrix representation with absolute values of all elements on a main diagonal equal to a first value, and with absolute values of all elements not on the main diagonal equal to a non-zero second value, and (ii) a matrix representation obtained by permuting rows and/or columns in an N-by-N matrix representation with absolute values of all elements on a main diagonal equal to a first value, and with absolute values of all elements not on the main diagonal equal to a non-zero second value, and
    when each of the N-by-N matrix representations is denoted by R, $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix}$$

a and b denote real parameters,
    each sign value $s_{i,j}$ satisfies
        $s_{i,j} \in \{-1,+1\}$, and
        $s_{i,i}s_{i,j} = -s_{j,i}s_{j,j}$ for all $i \neq j$, and
    the real parameters a and b satisfy
        $a^2 + (N-1)b^2 = 1$.

2. A reception apparatus for receiving a block of data over a plurality of transmission channels, the reception apparatus comprising:
    a receiver operable to receive a plurality of received complex symbols at a different time and/or at a different frequency, one of a plurality of rotated constellation points being generated in accordance with the block of data, each of the plurality of rotated constellation points having N components, each of the N components of the generated rotated constellation point being separated and mapped to a different one of a plurality of transmitted complex symbols, each of the plurality of the transmitted complex signals being transmitted at a different time and/or at a different frequency, the plurality of the received complex signals being obtained by receiving the plurality of the transmitted complex signals; and
    a demodulator operable to demodulate N components obtained from the plurality of received complex symbols based on a rotated constellation, wherein
    the plurality of rotated constellation points are obtained by applying an orthogonal transformation to each of a plurality of initial constellation points having N components so as to increase a reception robustness under fading conditions,
    N is a multiple of four, and
    the orthogonal transformation has one of (i) an N-by-N matrix representation with absolute values of all elements on a main diagonal equal to a first value, and with absolute values of all elements not on the main diagonal equal to a non-zero second value, and (ii) a matrix representation obtained by permuting rows and/or columns in an N-by-N matrix representation with absolute values of all elements on a main diagonal equal to a first value, and with absolute values of all elements not on the main diagonal equal to a non-zero second value, and
    when each of the N-by-N matrix representations is denoted by R, $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix}$$

a and b denote real parameters,
    each sign value $s_{i,j}$ satisfies
        $s_{i,j} \in \{-1,+1\}$, and
        $s_{i,i}s_{i,j} = -s_{j,i}s_{j,j}$ for all $i \neq j$, and
    the real parameters a and b satisfy
        $a^2 + (N-1)b^2 = 1$.

3. A transmission method for transmitting a block of data over a plurality of transmission channels, the transmission method comprising the steps of:
    generating one of a plurality of rotated constellation points in accordance with the block of data to be transmitted, each of the plurality of rotated constellation points having N components;
    separating and mapping each of the N components of the generated rotated constellation point to a different one of a plurality of complex symbols; and
    transmitting each of the complex symbols at a different time and/or at a different frequency, wherein
    the plurality of rotated constellation points are obtained by applying an orthogonal transformation to each of a plurality of initial constellation points having N components so as to increase a reception robustness under fading conditions,
    N is a multiple of four, and
    the orthogonal transformation has one of (i) an N-by-N matrix representation with absolute values of all elements on a main diagonal equal to a first value, and with absolute values of all elements not on the main diagonal equal to a non-zero second value, and (ii) a matrix representation obtained by permuting rows and/or columns in an N-by-N matrix representation with absolute values of all elements on a main diagonal equal to a first value, and with absolute values of all elements not on the main diagonal equal to a non-zero second value, and when each of the N-by-N matrix representations is denoted by R, $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix}$$

a and b denote real parameters,
each sign value $s_{i,j}$ satisfies $s_{i,j} \in \{-1, +1\}$, and $s_{i,i}s_{i,j} = -s_{j,i}s_{j,j}$ for all $i \neq j$, and the real parameters a and b satisfy $a^2 + (N-1)b^2 = 1$.

4. A reception method for receiving a block of data over a plurality of transmission channels, the reception method comprising the steps of:
receiving a plurality of received complex symbols at a different time and/or at a different frequency, one of a plurality of rotated constellation points being generated in accordance with the block of data, each of the plurality of rotated constellation points having N components, each of the N components of the generated rotated constellation point being separated and mapped to a different one of a plurality of transmitted complex symbols, each of the plurality of the transmitted complex symbols being transmitted at a different time and/or at a different frequency, the plurality of the received complex signals being obtained by receiving the plurality of the transmitted complex signals;
demodulating N components obtained from the plurality of received complex symbols based on a rotated constellation, wherein
the plurality of rotated constellation points are obtained by applying an orthogonal transformation to each of a plurality of initial constellation points having N components so as to increase a robustness under fading conditions,
N is a multiple of four, and
the orthogonal transformation has one of (i) an N-by-N matrix representation with absolute values of all elements on a main diagonal equal to a first value, and with absolute values of all elements not on the main diagonal equal to a non-zero second value, and (ii) a matrix representation obtained by permuting rows and/or columns in an N-by-N matrix representation with absolute values of all elements on a main diagonal equal to a first value, and with absolute values of all elements not on the main diagonal equal to a non-zero second value, and
when each of the N-by-N matrix representations is denoted by R, $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix}$$

a and b denote real parameters,
each sign value $s_{i,j}$ satisfies $s_{i,j} \in \{-1, +1\}$, and $s_{i,i}s_{i,j} = -s_{j,i}s_{j,j}$ for all $i \neq j$, and the real parameters a and b satisfy $a^2 + (N-1)b^2 = 1$.

5. A generation method for generating an N-dimensional rotated constellation for a digital modulation scheme in a data communication system, the generation method comprising the steps of:
receiving a plurality of vectors of an N-dimensional vector space; and
obtaining constellation points of the N-dimensional rotated constellation by applying an orthogonal transformation to the plurality of vectors received, each of the constellation points having N components, each of the N components being separated and mapped to a different one of a plurality of complex symbols, each of the plurality of complex symbols being transmitted at a different time and/or at a different frequency, wherein
the orthogonal transformation is adapted for increasing a minimum number of different values in components of any two distinct N-dimensional rotated constellation points relative to a minimum number of different values in components of any two distinct vectors received, and
the orthogonal transformation has one of (i) an N-by-N matrix representation, N being a multiple of four, with absolute values of all elements on a main diagonal equal to a first value, and with absolute values of all elements not on the main diagonal equal to a non-zero second value, and (ii) a matrix representation obtained by permuting rows and/or columns in an N-by-N matrix representation with absolute values of all elements on a main diagonal equal to a first value, and with absolute values of all elements not on the main diagonal equal to a non-zero second value, and
when each of the N-by-N matrix representations is denoted by R, $$R = \begin{pmatrix} s_{1,1}a & s_{1,2}b & \cdots & s_{1,N}b \\ s_{2,1}b & s_{2,2}a & & \vdots \\ \vdots & & \ddots & s_{N-1,N}b \\ s_{N,1}b & \cdots & s_{N,N-1}b & s_{N,N}a \end{pmatrix}$$

a and b denote real parameters,
each sign value $s_{i,j}$ satisfies $s_{i,j} \in \{-1, +1\}$, and $s_{i,i}s_{i,j} = -s_{j,i}s_{j,j}$ for all $i \neq j$, and the real parameters a and b satisfy $a^2 + (N-1)b^2 = 1$.

* * * * *